United States Patent
Uehara

(10) Patent No.: US 9,619,348 B2
(45) Date of Patent: Apr. 11, 2017

(54) METHOD, MEDIUM, SYSTEM, AND APPARATUS FOR SUPPLYING POWER AT THE TIME OF POWER OUTAGE

(71) Applicant: FUJITSU LIMITED, Kawasaki-shi, Kanagawa (JP)

(72) Inventor: Mikio Uehara, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 250 days.

(21) Appl. No.: 14/260,821

(22) Filed: Apr. 24, 2014

(65) Prior Publication Data

US 2014/0237290 A1  Aug. 21, 2014

Related U.S. Application Data

(63) Continuation of application No. PCT/JP2011/075108, filed on Oct. 31, 2011.

(51) Int. Cl.
| | |
|---|---|
| *G06F 11/00* | (2006.01) |
| *G06F 11/20* | (2006.01) |
| *G06F 9/48* | (2006.01) |
| *G06F 11/14* | (2006.01) |

(52) U.S. Cl.
CPC .......... *G06F 11/2015* (2013.01); *G06F 9/485* (2013.01); *G06F 11/1441* (2013.01); *G06F 2201/815* (2013.01); *Y02B 60/144* (2013.01)

(58) Field of Classification Search
CPC .......................... G06F 11/1441; G06F 11/2015
USPC .......................................................... 714/14
See application file for complete search history.

(56) References Cited

U.S. PATENT DOCUMENTS

| | | | |
|---|---|---|---|
| 7,543,166 B2* | 6/2009 | Zimmer | G06F 9/45533 713/310 |
| 2002/0083110 A1* | 6/2002 | Kozuch | G06F 1/3203 718/1 |
| 2003/0221070 A1 | 11/2003 | Minowa et al. | |
| 2007/0174658 A1 | 7/2007 | Takamoto et al. | |

(Continued)

FOREIGN PATENT DOCUMENTS

| | | |
|---|---|---|
| JP | 10-124405 | 5/1998 |
| JP | 2003-345528 | 12/2003 |

(Continued)

OTHER PUBLICATIONS

Japanese Office Action dated Jul. 28, 2015 in corresponding Japanese Patent Application No. 2013-541504.

(Continued)

*Primary Examiner* — Elmira Mehrmanesh
(74) *Attorney, Agent, or Firm* — Staas & Halsey LLP

(57) ABSTRACT

According to an aspect of an embodiment, an information processing apparatus includes a save unit, a stopping unit and a reserve power supply unit. The save unit saves, in a device including an uninterruptible power supply device, first information including information stored in a memory allocated to a virtual machine operated by the information processing apparatus and information stored in a register allocated to the virtual machine at a time of a power outage. The stopping unit stops the virtual machine when the save of the first information is completed. The reserve power supply unit supplies power needed for the processing performed by the save unit and the stopping unit at the time of the power outage.

9 Claims, 16 Drawing Sheets

(56) References Cited

U.S. PATENT DOCUMENTS

| | | | |
|---|---|---|---|
| 2009/0049204 A1* | 2/2009 | Boyd | G06F 9/45558 710/1 |
| 2009/0249354 A1* | 10/2009 | Yamaguchi | G06F 9/485 718/106 |
| 2011/0072430 A1* | 3/2011 | Mani | G06F 1/30 718/1 |
| 2013/0081016 A1* | 3/2013 | Saito | G06F 1/3287 718/1 |
| 2013/0185420 A1* | 7/2013 | Shimogawa | G06F 9/45558 709/224 |
| 2013/0332751 A1* | 12/2013 | Iwata | G06F 1/26 713/300 |

FOREIGN PATENT DOCUMENTS

| | | |
|---|---|---|
| JP | 2007-148839 | 6/2007 |
| JP | 2008-3735 | 1/2008 |
| JP | 2009-282714 | 12/2009 |
| JP | 2010-88211 | 4/2010 |
| WO | WO 2010/116405 A1 | 10/2010 |

OTHER PUBLICATIONS

International Search Report mailed Jan. 10, 2012 in corresponding International Patent Application No. PCT/JP2011/075108.

* cited by examiner

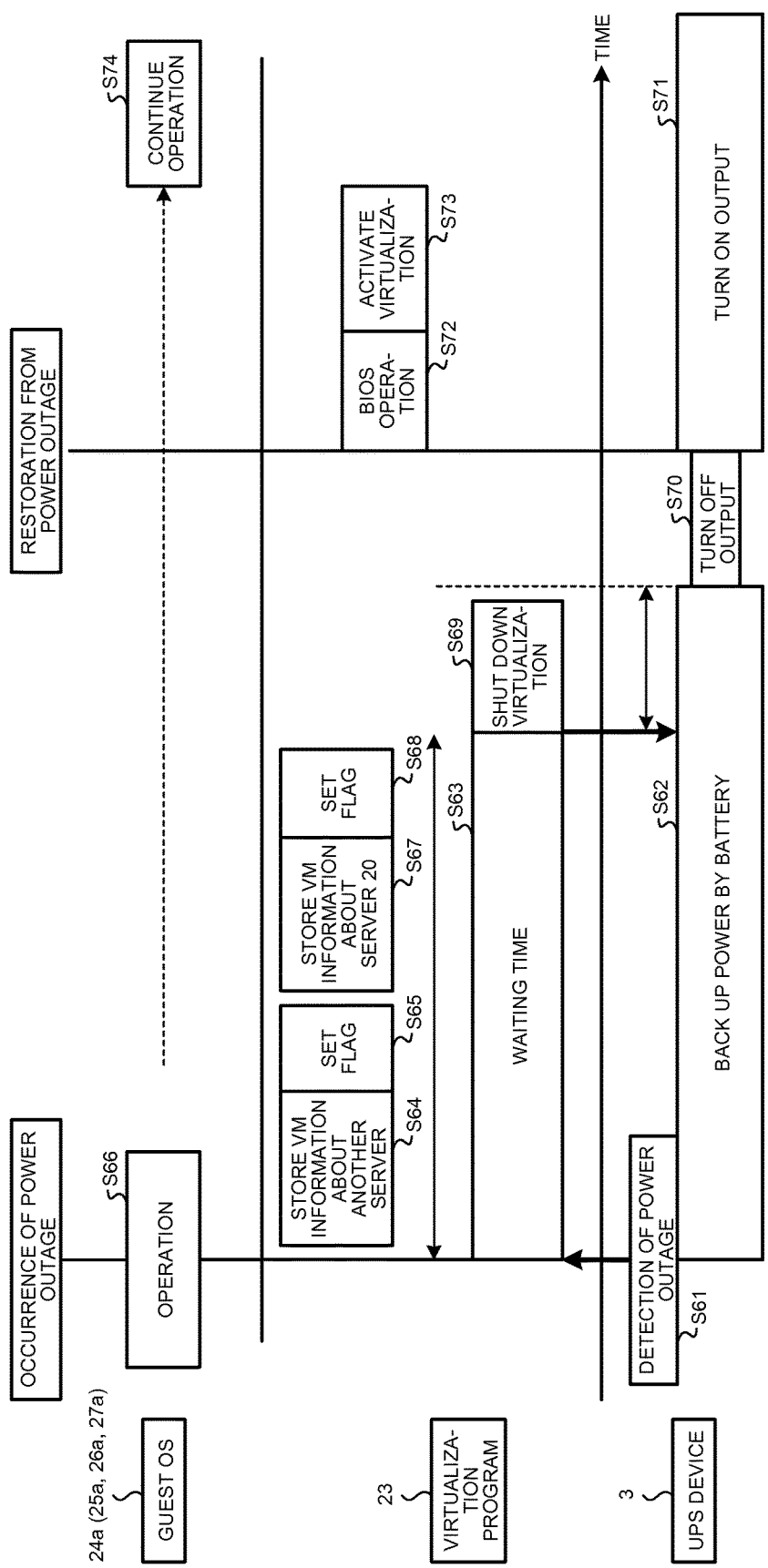

METHOD, MEDIUM, SYSTEM, AND APPARATUS FOR SUPPLYING POWER AT THE TIME OF POWER OUTAGE

CROSS-REFERENCE TO RELATED APPLICATION

This application is a continuation of International Application No. PCT/JP2011/075108, filed on Oct. 31, 2011, the entire contents of which are incorporated herein by reference.

FIELD

The embodiments discussed herein are related to an information processing apparatus, a method for controlling an information processing apparatus, and an information processing system.

BACKGROUND

A virtualization system can provide a plurality of environments called virtual machines on a physical machine. The virtual machines operate in a virtual region managed by a virtualization program such as a hypervisor, for example. A power supply of a server that implements the virtualization system is connected to an uninterruptible power supply (UPS) device provided for a power outage. At a time of a power outage, the server is supplied with power from a battery of the UPS and shuts down the virtualization system.

The following describes shutdown processing operation in a virtualization system according to a related technique with reference to FIG. 17. FIG. 17 is a schematic diagram illustrating the shutdown processing operation in a virtualization system according to a related technique. When a power outage occurs as illustrated in FIG. 17, a UPS detects the power outage (step S901) and supplies power from a battery (step S902).

A server waits for a certain period of time and then determines whether the server performs the processing to shut down the virtualization system (step S903). After the certain period of waiting time elapses, the server starts the shutdown processing of the virtualization system (step S904). In the shutdown processing, the server ends guest operating systems (OSs) and applications, and thereafter ends a virtualization program. The processing typically takes a few minutes. The UPS continues to supply power during the processing time, and thereafter turns off the output (step S905).

When power is restored from the power outage, the UPS turns on the output (step S906). The server then activates a basic input/output system (BIOS) (step S907) and re-activates the virtualization system (step S908).

In this manner, the server automatically stores the states of the virtual machines and stops the processing of the virtual machines by shutting down the virtualization system. The server restores the stored states of the virtual machines and automatically activates the virtual machines by re-activating the virtualization system.

The following techniques are known as those provided for a power outage. For example, Japanese Laid-open Patent Publication No. 10-124405 discloses a technique in which part of information stored in a volatile memory is transferred to another apparatus when a power outage occurs in the main power supply of a point-of-sale (POS) system. For another example, Japanese Laid-open Patent Publication No. 2003-345528 discloses a technique in which configuration information stored in a volatile memory is saved in a disk using a UPS when an abnormal condition occurs in the main power supply of a disk array apparatus, and the information is used for restoration.

The related techniques described above, however, have a problem in that the number of UPSs is unable to be reduced. Specifically, the shutdown processing of the virtualization system takes a few minutes and power needed during the processing is supplied from the UPS. The UPS needs to be provided for each server. Thus, a number of UPSs need to be provided for a plurality of servers. As a result, the number of UPSs increases in accordance with the number of servers. The disclosed techniques described above are not capable of reducing the number of UPSs.

SUMMARY

According to an aspect of an embodiment, an information processing apparatus includes a save unit, a stopping unit and a reserve power supply unit. The save unit saves, in a device including an uninterruptible power supply device, first information including information stored in a memory allocated to a virtual machine operated by the information processing apparatus and information stored in a register allocated to the virtual machine at a time of a power outage. The stopping unit stops the virtual machine when the save of the first information is completed. The reserve power supply unit supplies power needed for the processing performed by the save unit and the stopping unit at the time of the power outage.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9B is a schematic diagram illustrating processing operation to shut down a virtualization system at a time of a power outage and to re-activate the virtualization system at a time of restoration from the power outage in the save server;

DESCRIPTION OF EMBODIMENTS

Preferred embodiments of the present invention will be explained with reference to accompanying drawings. The embodiments do not limit the invention. The embodiments can be performed in any combination of them without inconsistency among them.

[a] First Embodiment

In a first embodiment, a structure of a system and operation of processing in the system are described with reference to FIGS. 1, 2A, and 2B.

Structure of an Information Processing System According to the First Embodiment

Figure 1:
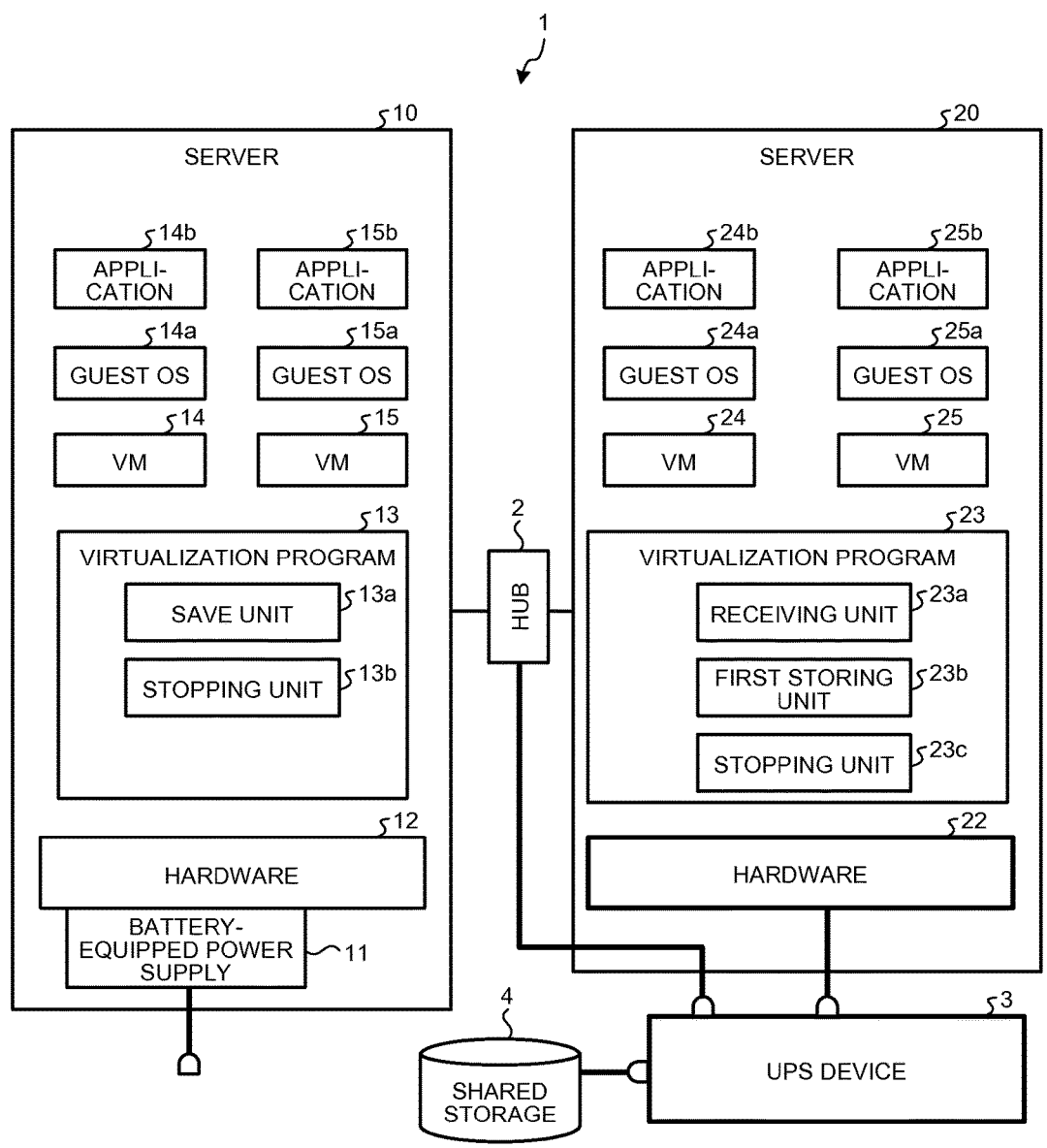
FIG. 1 is a schematic diagram illustrating an example of a structure of the information processing system according to a first embodiment.

FIG. 1 is a schematic diagram illustrating an example of a structure of an information processing system according to the first embodiment. As illustrated in FIG. 1, an information processing system 1 according to the first embodiment includes a hub 2, an uninterruptible power supply (UPS) device 3, a shared storage 4, a server 10, and a server 20. As described later, a server virtualization technique is applied to the servers 10 and 20.

The hub 2 connects the server 10 and the server 20 so as to enable communication therebetween. The UPS device 3 supplies power to the server 20, the hub 2, the shared storage 4 in a normal state while the UPS device 3 supplies reserve power from a battery built therein to the server 20, the hub 2, the shared storage 4 at a time of a power outage.

The server 10 includes a battery-equipped power supply 11 and hardware 12. The battery-equipped power supply 11 supplies power to the server 10 in a normal state. The battery-equipped power supply 11 includes a power outage detection circuit and supplies reserve power from a battery built therein to the server 10 when detecting an occurrence of a power outage. A battery capacity of the battery-equipped power supply 11 is smaller than that of the UPS device 3.

The hardware 12 includes a central processing unit (CPU) and a main memory, for example, and operates a plurality of virtual machines. In the example illustrated in FIG. 1, the server 10 operates a virtual machine (VM) 14 and a VM 15 by a virtualization program 13 functioning on the hardware 12. The VM 14 operates a guest operating system (OS) 14a and an application 14b while the VM 15 operates a guest OS 15a and an application 15b.

The virtualization program 13 includes a save unit 13a and a stopping unit 13b, and controls the shutdown of the virtualization system at a time of a power outage. The save unit 13a saves guest OS information and application information in the shared storage at the time of a power outage. The term save means transfer such as by copying. The save unit 13a saves virtual machine information including information stored in memories allocated to the virtual machines and information stored in registers allocated to the virtual machines in another apparatus that is used for the save and includes an uninterruptible power supply device. The stopping unit 13b stops the virtual machines when the save of the virtual machine information is completed.

The server 20 includes hardware 22. The hardware 22 includes a CPU and a main memory, for example, and operates a plurality of virtual machines. In the example illustrated in FIG. 1, the server 20 operates VMs 24 and 25 by a virtualization program 23 functioning on the hardware 22. The VM 24 operates a guest OS 24a and an application 24b while the VM 25 operates a guest OS 25a and an application 25b.

The virtualization program 23 includes a receiving unit 23a, a first storing unit 23b, and a stopping unit 23c, and controls the shutdown of the virtualization system at the time of a power outage. The receiving unit 23a receives, from another apparatus, the virtual machine information (VM information) indicating the information stored in the memories allocated to the virtual machines of the other apparatus and the information stored in the registers allocated to the virtual machines at the time of a power outage. The first storing unit 23b stores the virtual machine information about the other apparatus and the virtual machine information about the server 20 in a storage device included in the server 20. The stopping unit 23c stops the virtual machines of the server 20 when the save of the virtual machine information is completed.

The server 20 is supplied with power from the UPS device 3 as described above, and functions as a save server in which the virtual machines that are running on the server 10 are saved at the time of a power outage. In the following description, the server 20 is described as the save server 20 as appropriate.

Figure 2A:
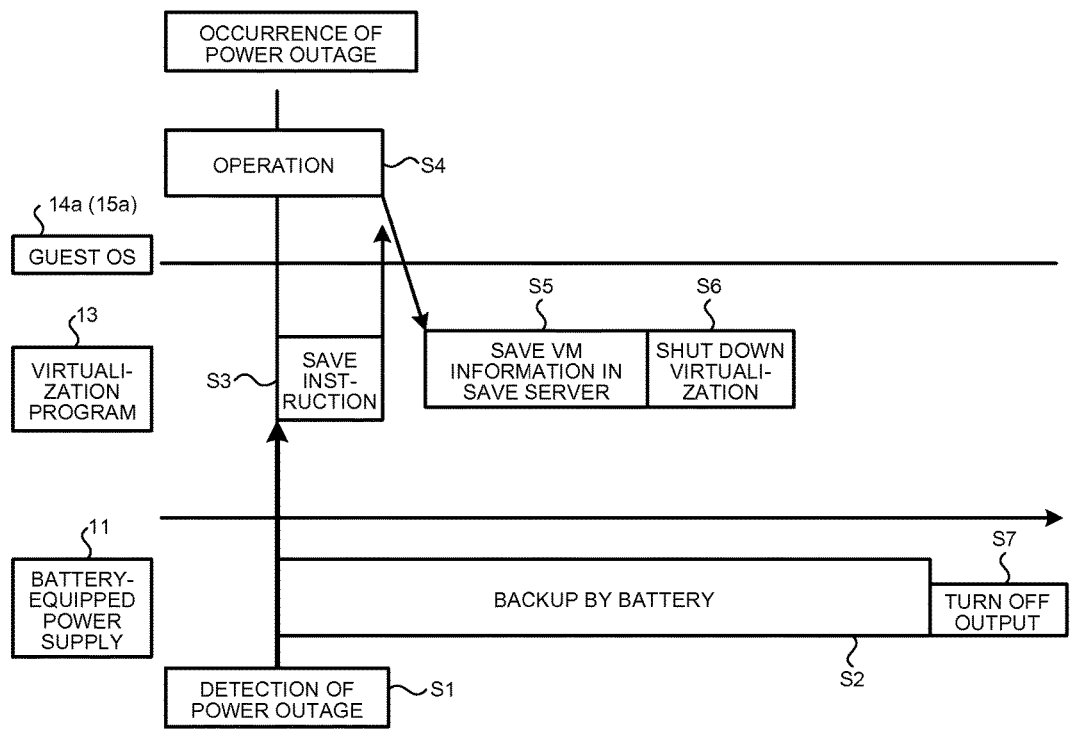
FIG. 2A is a schematic diagram illustrating processing operation of a server when a power outage occurs.
Figure 2B:
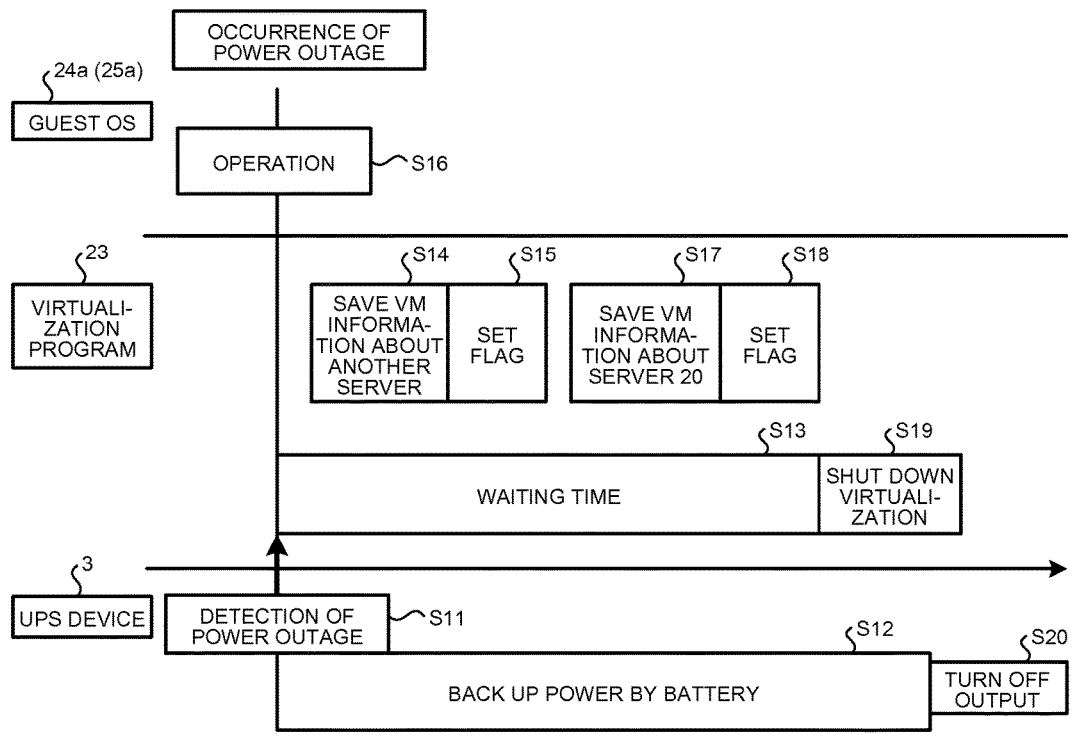
FIG. 2B is a schematic diagram illustrating processing operation of a save server when a power outage occurs.

Processing Operation in the Information Processing System According to the First Embodiment when a Power Outage Occurs The following describes processing operation in the information processing system 1 when a power outage occurs with reference to FIGS. 2A and 2B. FIG. 2A is a schematic diagram illustrating the processing operation of the server when a power outage occurs. FIG. 2B is a schematic diagram illustrating the processing operation of the save server when a power outage occurs.

The Processing Operation of the Server when a Power Outage Occurs

As illustrated in FIG. 2A, when the power outage detection circuit included in the battery-equipped power supply 11 of the server 10 detects a power outage (step S1), the battery-equipped power supply 11 supplies reserve power from the battery (step S2). The save unit 13a receives a save instruction when the power outage detection circuit detects the power outage (step S3). The save unit 13a then stops the operation of the guest OSs 14a and 15a and stores the guest OS information and the application information in the shared storage (step S4).

The save unit 13a saves the VM information in the server 20 (step S5). Subsequently, the stopping unit 13b stops the VMs 14 and 15 to shutdown the virtualization (step S6). The processing from step S3 to step S6 is completed in about several tens of seconds. The battery-equipped power supply 11 turns off the output after the supply of the reserve power (step S7).

The Processing Operation of the Save Server when the Power Outage Occurs

As illustrated in FIG. 2B, when a power outage detection circuit included in the UPS device 3 detects the power outage (step S11), the UPS device 3 supplies reserve power from the battery (step S12). The virtualization program 23 of the server 20 waits for a certain period of time as waiting time (step S13).

During the waiting time, the receiving unit 23a receives the VM information about the server 10 from the server 10. The first storing unit 23b stores the received VM information in the storage device (step S14) and sets a flag indicating that the information is normally stored (step S15). The virtualization program 23 instructs the guest OSs 24a and 25a to be saved and stops the operation of the guest OSs 24a and 25a (step S16).

The first storing unit 23b stores the VM information about the server 20 in the storage device (step S17) and sets the flag indicating that the information is normally stored (step S18). Subsequently, the stopping unit 23c stops the VMs 24 and 25 to shutdown the virtualization (step S19). The processing from step S14 to step S19 is completed in about a few minutes. The UPS device 3 turns off the output after the supply of the reserve power (step S20).

As described above, the server 10 saves the VM information in the server 20 connected to the UPS device 3 using power supplied from the battery-equipped power supply 11 when shutting down the virtualization system at the time of a power outage. As a result, the information processing system 1 can also reduce the number of UPS devices 3.

In addition, the virtualization program can be ended in a shorter time than a case where the virtualization program is ended after the guest OSs and the applications are ended. As a result, the server 10 can reduce the power consumption at the time of a power outage.

The server 20 stores the VM information about the server 10 saved by the server 10 and the VM information about the server 20 in the storage device using a period of time that typically elapses as the waiting time. This processing makes it possible for the virtualization program to be ended in a shorter time than a case where the virtualization program is ended after the guest OSs and the applications are ended. As a result, the server 20 can reduce the power consumption at the time of a power outage.

[b] Second Embodiment

In the first embodiment, the information processing system includes two servers. Recently, some data centers operate a plurality of servers housed in a single rack. In a second embodiment, an example of an information processing system is described in which a plurality of servers are housed in a single rack.

Figure 3:
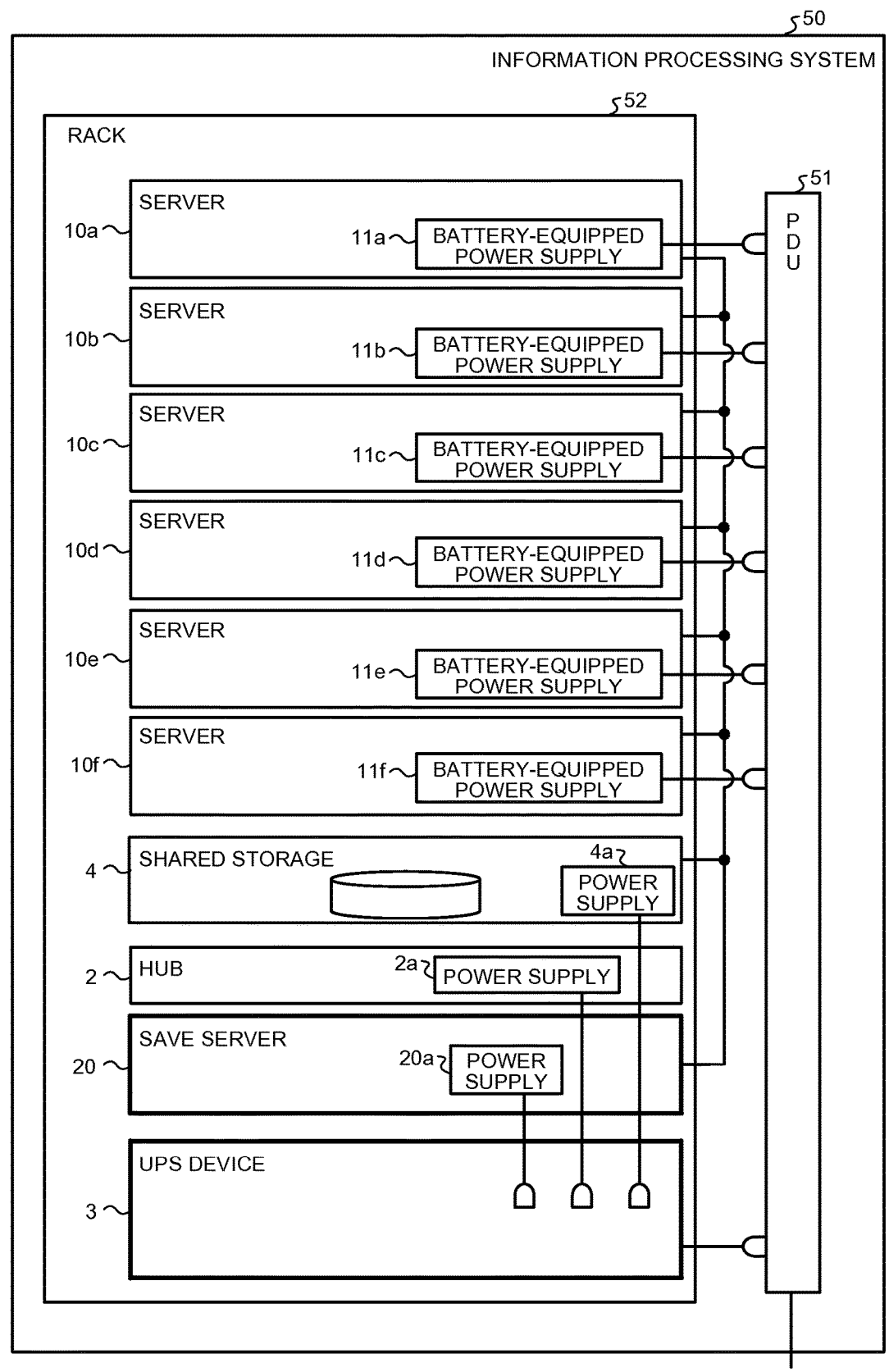
FIG. 3 is a schematic diagram illustrating an example of a structure of an information processing system according to a second embodiment.

Structure of an Information Processing System According to the Second Embodiment FIG. 3 is a schematic diagram illustrating an example of a structure of an information processing system according to the second embodiment. As illustrated in FIG. 3, an information processing system 50 includes a power distribution unit (PDU) 51 and a rack 52. The rack 52 houses the hub 2, the UPS device 3, the shared storage 4, servers 10a, 10b, 10c, 10d, 10e, and 10f, and the save server 20. The individual servers, and the servers and the save server 20 are coupled through the hub 2 so as to enable communication therebetween. The servers and the save server 20 are connected to the shared storage 4. The servers and the UPS device 3 are connected to the PDU 51.

The hub 2 connects the individual servers, and the servers and the save server 20 so as to enable communication therebetween. The hub 2 includes a power supply 2a.

The UPS device 3, which is connected to the PDU 51, supplies power to the hub 2, the shared storage 4, and the save server 20 in a normal state while the UPS device 3 supplies reserve power from the battery built therein to the hub 2, the shared storage 4, and the server 20 at a time of a power outage.

The shared storage 4, which is a hard disk drive (HDD), for example, receives data input from and outputs data to the servers and the save server 20. The shared storage 4 includes a power supply 4a.

The server 10a includes a battery-equipped power supply 11a and performs various types of arithmetic operation using power supplied from the battery-equipped power supply 11a. The server 10a is supplied with backup power from a battery built in the battery-equipped power supply 11a at the time of a power outage. The servers 10b to 10f have the same structure as that of the server 10a. The detailed descriptions thereof are thus omitted. In the following description, the servers 10a to 10f are described as the server 10 when they are collectively described by a generalized expression.

The save server 20 includes a power supply 20a and performs various types of arithmetic operation using power supplied from the power supply 20a. The save server 20 is supplied with backup power from the battery built in the UPS device 3 at the time of a power outage.

Structure of the UPS Device

Figure 4:
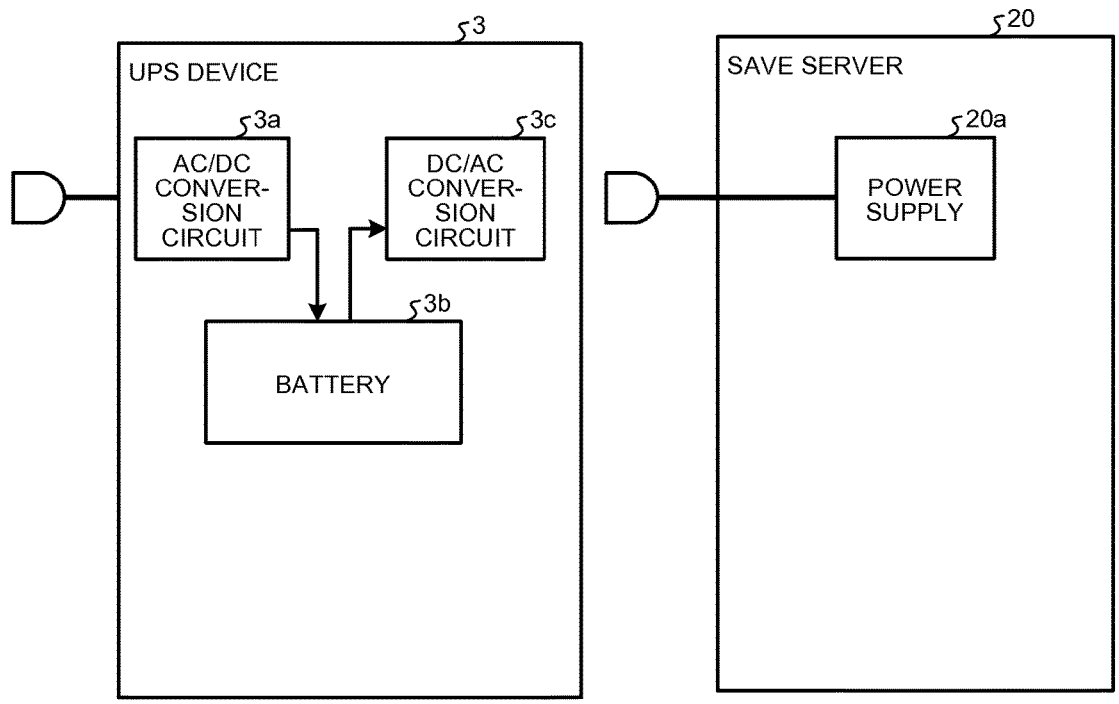
FIG. 4 is a schematic diagram illustrating an example of a structure of an uninterruptible power supply (UPS) device.

FIG. 4 is a schematic diagram illustrating an example of the structure of the UPS device. As illustrated in FIG. 4, the UPS device 3 includes an alternating current/direct current (AC/DC) conversion circuit 3a, a battery 3b, and a DC/AC conversion circuit 3c. The UPS device 3 is coupled to the save server 20 with a power supply cable.

The AC/DC conversion circuit 3a converts power supplied from the PDU 51 from AC to DC, and outputs the converted power to the DC/AC conversion circuit 3c and the battery 3b. The DC/AC conversion circuit 3c outputs power supplied from the AC/DC conversion circuit 3a and the battery 3b to the power supply 20a of the save server 20.

The battery 3b is charged with power supplied from the AC/DC conversion circuit 3a when no power outage occurs while the battery 3b supplies the charged power to the DC/AC conversion circuit 3c when a power outage occurs.

The UPS device 3 includes the power outage detection circuit (not illustrated). The power outage detection circuit notifies the save server 20 of the detection of a power outage.

Hardware Structure of the Server

Figure 5:
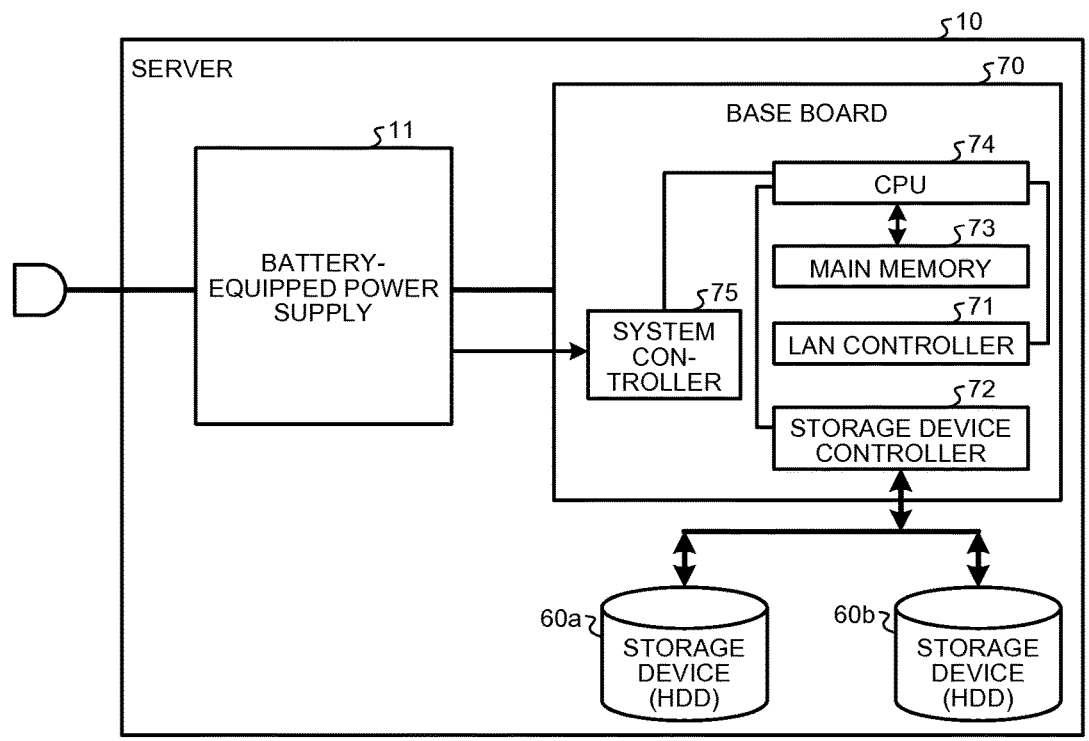
FIG. 5 is a schematic diagram illustrating an example of a hardware structure of the server.

FIG. 5 is a schematic diagram illustrating an example of a hardware structure of the server. As illustrated in FIG. 5, the server 10 includes the battery-equipped power supply 11, a storage device 60a, a storage device 60b, and a base board 70.

The storage device 60a, which is an HDD, for example, receives data input from and outputs data to the server 10.

The storage device 60b has the same structure as the storage device 60a. The detailed description thereof is thus omitted.

The base board 70 includes a local area network (LAN) controller 71, a storage device controller 72, a main memory 73, a CPU 74, and a system controller 75.

The LAN controller 71 controls the exchange of information between the CPU 74, and the other servers and the save server 20 through the hub 2 (not illustrated).

The storage device controller 72 controls the exchange of data between the CPU 74, and the storage device 60a and the storage device 60b.

The main memory 73, which is a random access memory (RAM), for example, stores data and a program used by the CPU for various types of arithmetic operation. The CPU 74 executes the program stored in the main memory 73.

The system controller 75 instructs the CPU 74 to execute interrupt processing when receiving a power outage signal indicating the occurrence of a power outage from a power outage detection circuit 91, which is described later.

The hardware structure of the save server 20 is the same as that of the server 10 except that the save server 20 includes a power supply having no battery instead of the battery-equipped power supply 11 included in the server 10.

Structure of Battery-Equipped Power Supply

Figure 6:
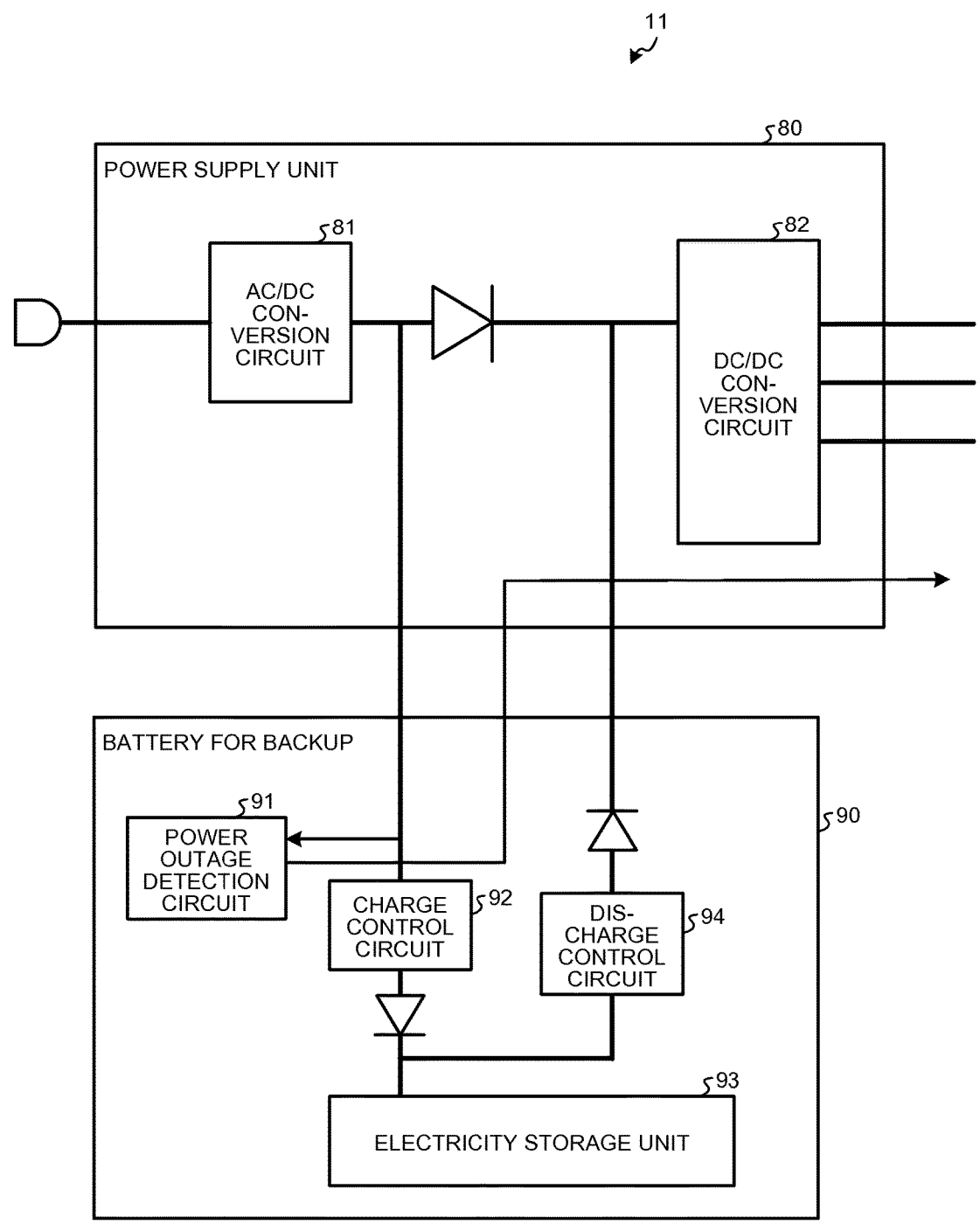
FIG. 6 is a schematic diagram illustrating an example of a structure of a battery-equipped power supply.

FIG. 6 is a schematic diagram illustrating an example of a structure of the battery-equipped power supply. As illustrated in FIG. 6, the battery-equipped power supply 11 includes a power supply unit 80 and a battery for backup 90. In the following description, the power supply unit 80 is described as the power supply 80 while the battery for backup 90 is described as the battery 90.

The power supply 80 is connected to the PDU 51 and supplies, to the battery 90 and the server 10, power supplied from the PDU 51. The power supply 80 includes an AC/DC conversion circuit 81 and a DC/DC conversion circuit 82, for example.

The AC/DC conversion circuit 81 converts power supplied from the PDU 51 from AC to DC, and outputs the converted power to the DC/DC conversion circuit 82 and the battery 90. The DC/DC conversion circuit 82 outputs, to the server 10, power supplied from the AC/DC conversion circuit 81 and the battery 90.

The battery 90 includes the power outage detection circuit 91, a charge control circuit 92, an electricity storage unit 93, and a discharge control circuit 94. In the battery 90, power supplied through the charge control circuit 92 is charged in the electricity storage unit 93 when no power outage occurs. The battery 90 supplies power charged in the electricity storage unit 93 to the power supply unit 80 through the discharge control circuit 94 when a power outage occurs. The capacity of the battery 90 is smaller than that of the battery 3b included in the UPS device 3.

The power outage detection circuit 91 watches the voltage output from the AC/DC conversion circuit 81 and detects whether a power outage occurs. For example, when detecting a drop in the voltage, the power outage detection circuit 91 transmits, to the system controller 75, the power outage signal indicating that a power outage occurs. As a result, the system controller 75 instructs the CPU 74 to execute the interrupt processing.

Figure 7:
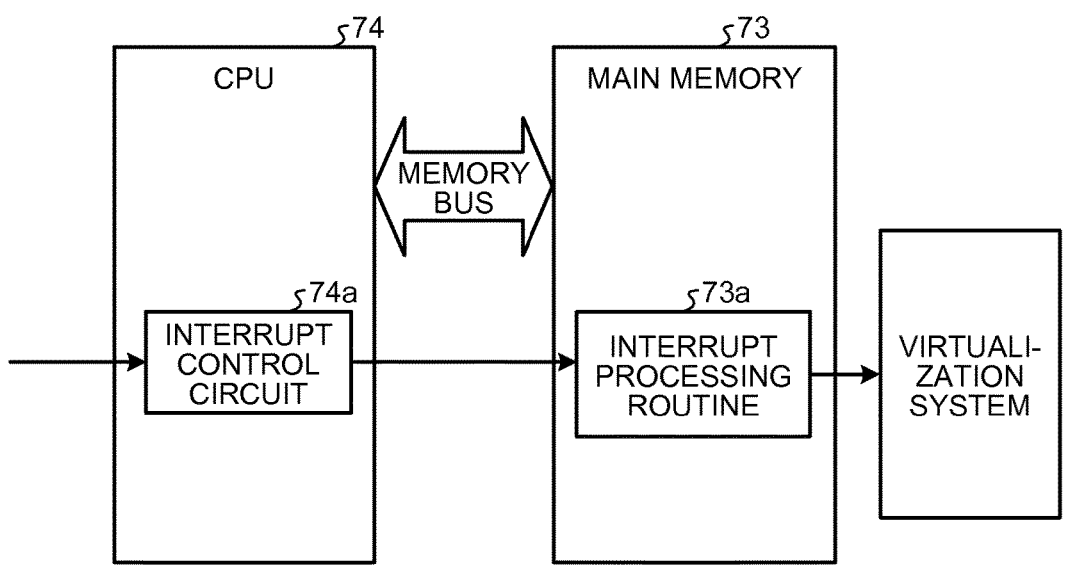
FIG. 7 is a schematic diagram illustrating interrupt processing to start save processing of virtual machines (VMs) at a time of a power outage.

Interrupt Processing to Start Save Processing of the VMs at the Time of a Power Outage The following describes the interrupt processing to start save processing of the VMs at the time of a power outage with reference to FIG. 7. FIG. 7 is a schematic diagram illustrating the interrupt processing to start the save processing of the VMs at the time of a power outage.

An interrupt control circuit 74a, which is illustrated in FIG. 7 and included in the CPU 74, performs the following processing when receiving, from the system controller 75, the instruction of the execution of the interrupt processing at the time of detection of a power outage. The interrupt control circuit 74a reads an interrupt processing routine 73a stored in the main memory 73 and executes the read interrupt processing routine 73a. As a result, the CPU 74 starts the save processing of the virtual machines.

Functional Structures of the Servers According to the Second Embodiment

Figure 8:
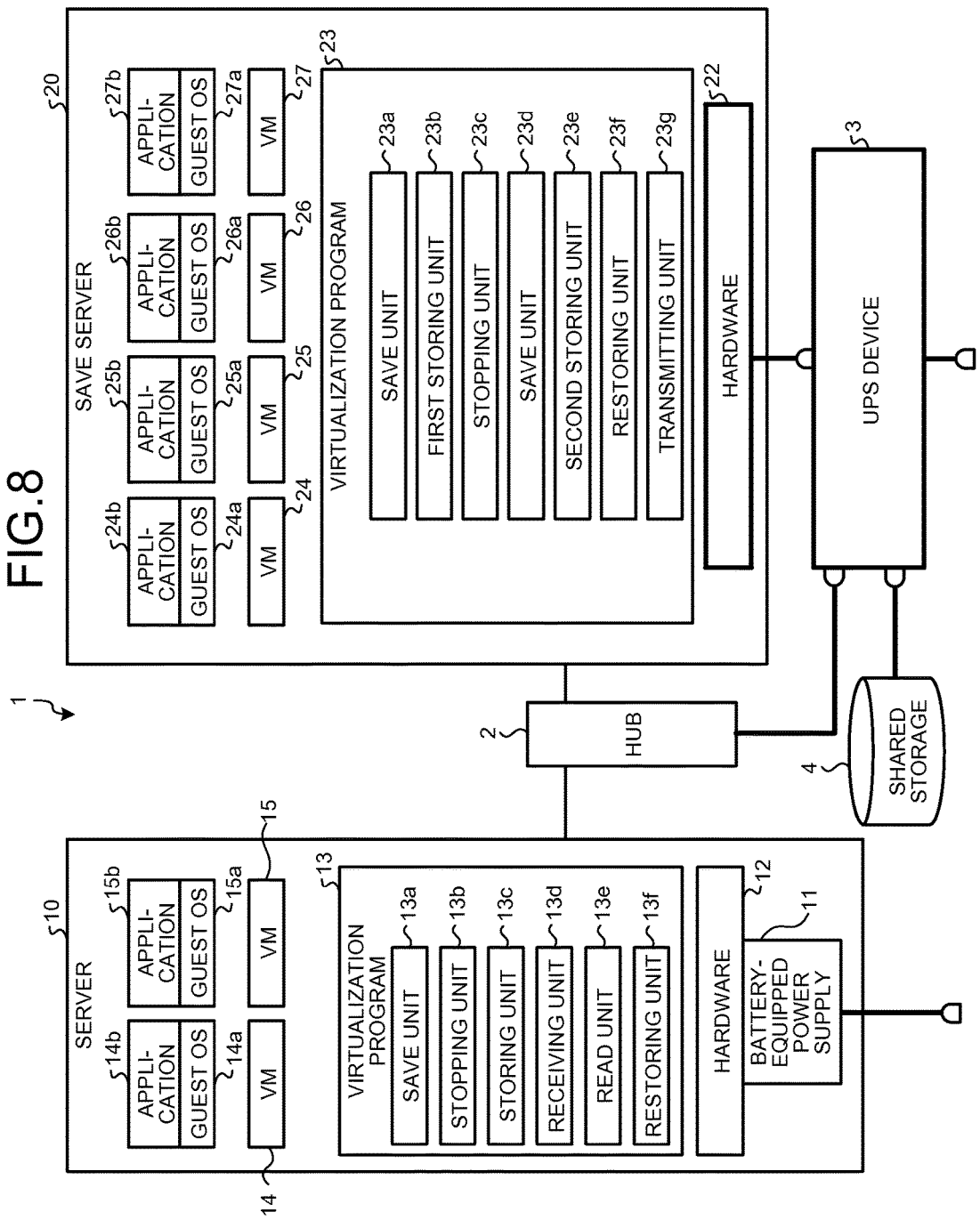
FIG. 8 is a functional block diagram illustrating functional structures of the servers according to the second embodiment.

The following describes functional structures of the servers according to the second embodiment with reference to FIG. 8. FIG. 8 is a functional block diagram illustrating the functional structures of the servers according to the second embodiment. FIG. 8 illustrates only the server 10 and the save server 20 out of the servers illustrated in FIG. 3. The same elements as those illustrated in FIG. 1 are labeled with the same reference numerals, and descriptions thereof are thus omitted.

As illustrated in FIG. 8, the information processing system 1 according to the second embodiment includes the hub 2, the UPS device 3, the shared storage 4, the server 10, and the save server 20. The server 10 includes the battery-equipped power supply 11 and the hardware 12. The server 10 operates the VMs 14 and 15 by the virtualization program 13 functioning on the hardware 12.

The virtualization program 13 includes the save unit 13a, the stopping unit 13b, a storing unit 13c, a receiving unit 13d, a read unit 13e, and a restoring unit 13f, and controls the shutdown of the virtualization system at a time of a power outage and the re-activation of the virtualization system at the time of restoration from the power outage.

The save unit 13a saves the virtual machine information including the information stored in the memories allocated to the virtual machines and the information stored in the registers allocated to the virtual machines in another apparatus that is used for the save and includes the uninterruptible power supply device at a time of a power outage.

For example, the save unit 13a receives a save instruction when the power outage detection circuit 91 detects a power outage, and stops the operation of the guest OSs 14a and 15a.

The save unit 13a produces implementation processing information including information about the guest OSs and the applications in a file format.

The save unit 13a produces the VM information including the information about the memories allocated to the VMs and the information about the CPU registers allocated to the VMs as data in a file format. The save unit 13a transmits the produced data in a file format to the save server 20.

The stopping unit 13b stops the VMs 14 and 15, and shuts down the virtualization system, when the save of the virtual machine information is completed.

The storing unit 13c stores, in the shared storage 4 shared with the other apparatuses, the implementation processing information that is produced by the save unit 13a and including the information about the guest OSs and the applications that are implemented by the virtual machines.

The receiving unit 13d receives, from the save server 20, the saved virtual machine information at the time of restoration from the power outage. The read unit 13e reads the implementation processing information from the shared storage 4 shared with the other apparatuses.

The restoring unit 13f restores the states of the virtual machines before the save on the basis of the virtual machine information and the implementation processing information.

The restoring unit 13f restores the VM information on the basis of the VM information received by the receiving unit 13d from the save server 20. The restoring unit 13f restores the implementation processing information read by the read unit 13e from the shared storage 4. As a result, the guest OSs 14a and 15a continue the operation.

The server 20 includes the hardware 22. The server 20 operates VMs 24, 25, 26, and 27 by the virtualization program 23 functioning on the hardware 22.

The virtualization program 23 includes the receiving unit 23a, the first storing unit 23b, the stopping unit 23c, a save unit 23d, a second storing unit 23e, a restoring unit 23f, and a transmitting unit 23g, and controls the shutdown of the virtualization system at a time of a power outage and the re-activation of the virtualization system at a time of restoration from the power outage.

The receiving unit 23a receives, from the server 10, the virtual machine information in a file format that includes the information stored in the memories allocated to the virtual machines of the server 10 and the information stored in the registers allocated to the virtual machines at the time of a power outage.

The first storing unit 23b stores the virtual machine information about the other apparatus and the virtual machine information about the server 20 in the storage device included in the server 20. The first storing unit 23b stores the VM information received from the server 10 in the storage device and sets a flag indicating that the information is normally stored. The first storing unit 23b stores the VM information about the server 20 in the storage device and sets the flag indicating that the information is normally stored.

For example, the first storing unit 23b determines whether the storing is normally completed. When determining that the storing is normally completed, the first storing unit 23b sets a normal completion flag. When determining that the storing is not normally completed, the first storing unit 23b clears the normal completion flag.

The stopping unit 23c stops the VMs 24, 25, 26, and 27 and shuts down the virtualization system when the storing of the VM information is completed.

The save unit 23d stops the guest OSs. After stopping the guest OSs, the save unit 23d produces the implementation processing information including the information about the guest OSs and the information about the applications in a file format. The save unit 23d produces the VM information including the information about the memories allocated to the VMs and the information about the CPU registers allocated to the VMs as data in a file format.

The second storing unit 23e stores the implementation processing information produced by the save unit 23d in the shared storage 4 shared with the other apparatuses. The first storing unit 23b stores the VM information in the storage device included in the server 20 and sets the flag indicating that the information is normally stored when the information is normally stored.

At the time of restoration from the power outage, the restoring unit 23f reads the virtual machine information from the storage device included in the server 20 and the implementation processing information from the shared storage 4 shared with the other apparatuses, and restores the states of the virtual machines before the save.

For example, the restoring unit 23f checks the flag. The restoring unit 23f then reads the VM information about the server 10 from the storage device, and restores the VM information.

For example, the restoring unit 23f checks the flag. After checking the flag, the restoring unit 23f reads the VM information about the server 20 from the storage device, and restores the VM information.

The restoring unit 23f checks the normal completion flag and determines whether the storing is normally completed. When determining that the storing is normally completed, the restoring unit 23f reads the VM information from the storage device, and restores the VM information. The restoring unit 23f reads the implementation processing information from the shared storage 4, and restores the implementation processing information. When determining that the storing is not normally completed, the restoring unit 23f stops the re-activation.

The restoring unit 23f reads the implementation processing information from the shared storage 4, and restores the implementation processing information.

The transmitting unit 23g transmits, to the server 10, the VM information about the server 10 read from the storage device included in the server 20.

The server 20 is supplied with power from the UPS device 3 as described above, and functions as a save server in which the virtual machines that are running on the server 10 are saved at the time of a power outage.

Figure 9A:
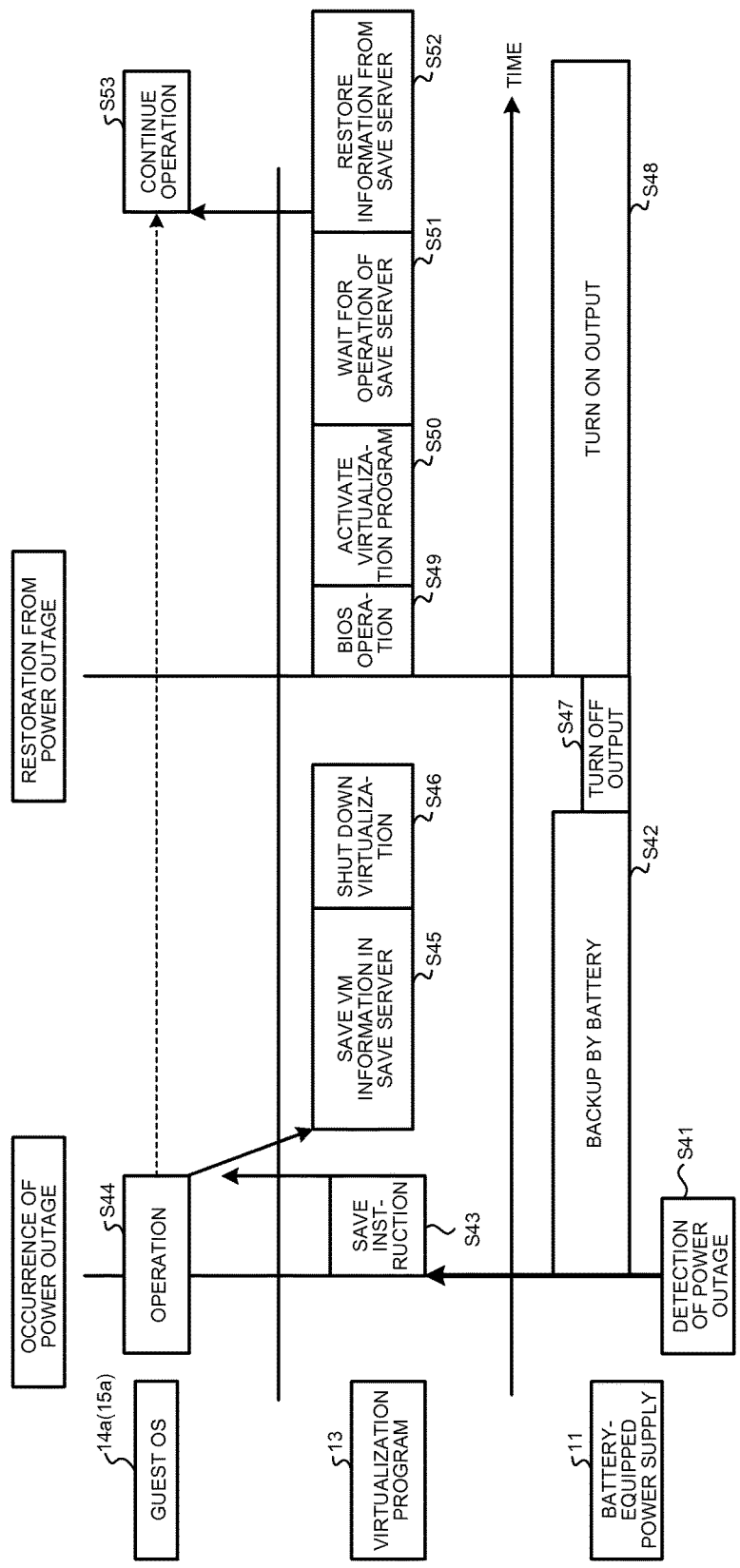
FIG. 9A is a schematic diagram illustrating processing operation to shut down a virtualization system at a time of a power outage and to re-activate the virtualization system at a time of restoration from the power outage in the server.

Processing Operation of the Information Processing System According to the Second Embodiment The following describes the processing operation to shut down the virtualization system at the time of a power outage and to re-activate the virtualization system at the time of restoration from the power outage in the server 10 and the save server 20 with reference to FIGS. 9A and 9B.

Processing in the Server

FIG. 9A is a schematic diagram illustrating the processing operation to shut down the virtualization system at the time of a power outage and to re-activate the virtualization system at the time of restoration from the power outage in the server 10. As illustrated in FIG. 9A, when the power outage detection circuit 91 included in the battery-equipped power supply 11 detects a power outage (step S41), the battery-equipped power supply 11 supplies reserve power from the battery (step S42). The save unit 13a receives the save instruction when the power outage detection circuit 91 detects the power outage (step S43). The save unit 13a stops the operation of the guest OSs 14a and 15a (step S44).

The save unit 13a saves the VM information in the server 20 (step S45). Subsequently, the stopping unit 13b stops the VMs 14 and 15 to shutdown the virtualization (step S46). The processing from step S43 to step S46 is completed in about several tens of seconds. The battery-equipped power supply 11 turns off the output after the supply of the reserve power (step S47).

When power is restored from the power outage, the battery-equipped power supply 11 turns on the output (step S48). A basic input/output system (BIOS) starts to operate (step S49) and the virtualization program 13 is activated (step S50). The virtualization program 13 waits until the save server 20 starts to operate (step S51). The restoring unit 13f restores the information on the basis of the VM information received by the receiving unit 13d from the save server 20 (step S52). As a result, the guest OSs 14a and 15a continue the operation (step S53).

Processing in the Save Server

FIG. 9B is a schematic diagram illustrating the processing operation to shut down the virtualization system at the time of a power outage and to re-activate the virtualization system at the time of restoration from the power outage in the save server. As illustrated in FIG. 9B, when the power outage detection circuit included in the UPS device 3 detects a power outage (step S61), the UPS device 3 supplies reserve power from the battery (step S62). The virtualization program 23 of the server 20 waits for a certain period of time as a waiting state (step S63).

During the waiting time, the receiving unit 23a receives the VM information about the server 10 from the server 10. The first storing unit 23b stores the received VM information in the storage device (step S64) and sets the flag indicating that the information is normally stored (step S65). The virtualization program 23 instructs the guest OSs 24a, 25a, 26a, and 27a to be saved and stops the operation of the guest OSs 24a, 25a, 26a, and 27a (step S66).

The first storing unit 23b stores the VM information about the server 20 in the storage device (step S67) and sets the flag indicating that the information is normally stored (step S68). Subsequently, the stopping unit 23c stops the VMs 24, 25, 26, and 27 to shutdown the virtualization (step S69). The processing from step S64 to step S69 is completed in about a few minutes. The UPS device 3 turns off the output after the supply of the reserve power (step S70).

When power is restored from the power outage, the UPS device 3 turns on the output (step S71). The BIOS starts to operate (step S72) and the virtualization program 23 is activated (step S73). The restoring unit 23f restores the information on the basis of the VM information. As a result, the guest OSs 24a, 25a, 26a, and 27a continue the operation (step S74).

Figure 10:
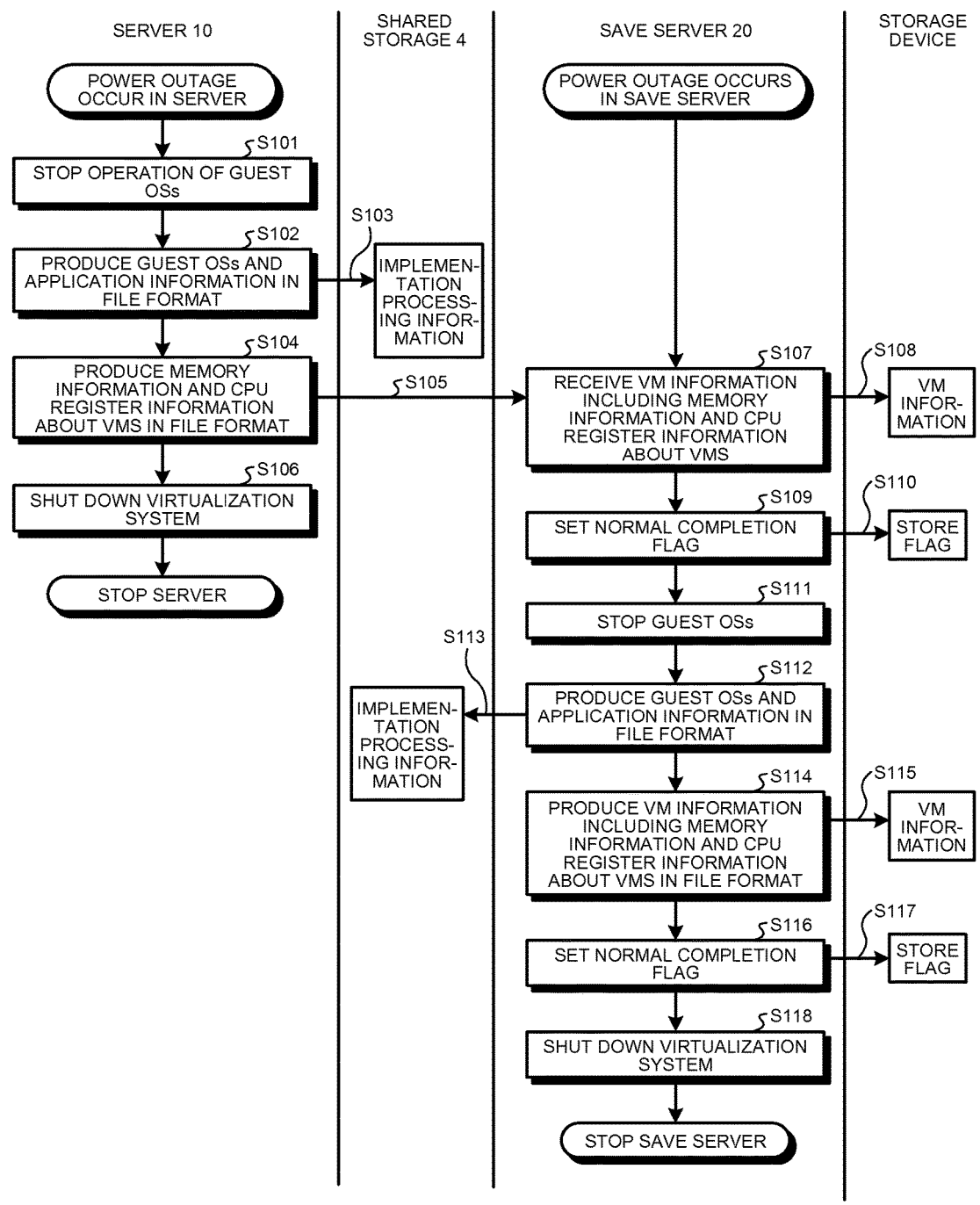
FIG. 10 is a sequence diagram illustrating the shutdown processing of the virtualization system when a power outage occurs.
Figure 11:
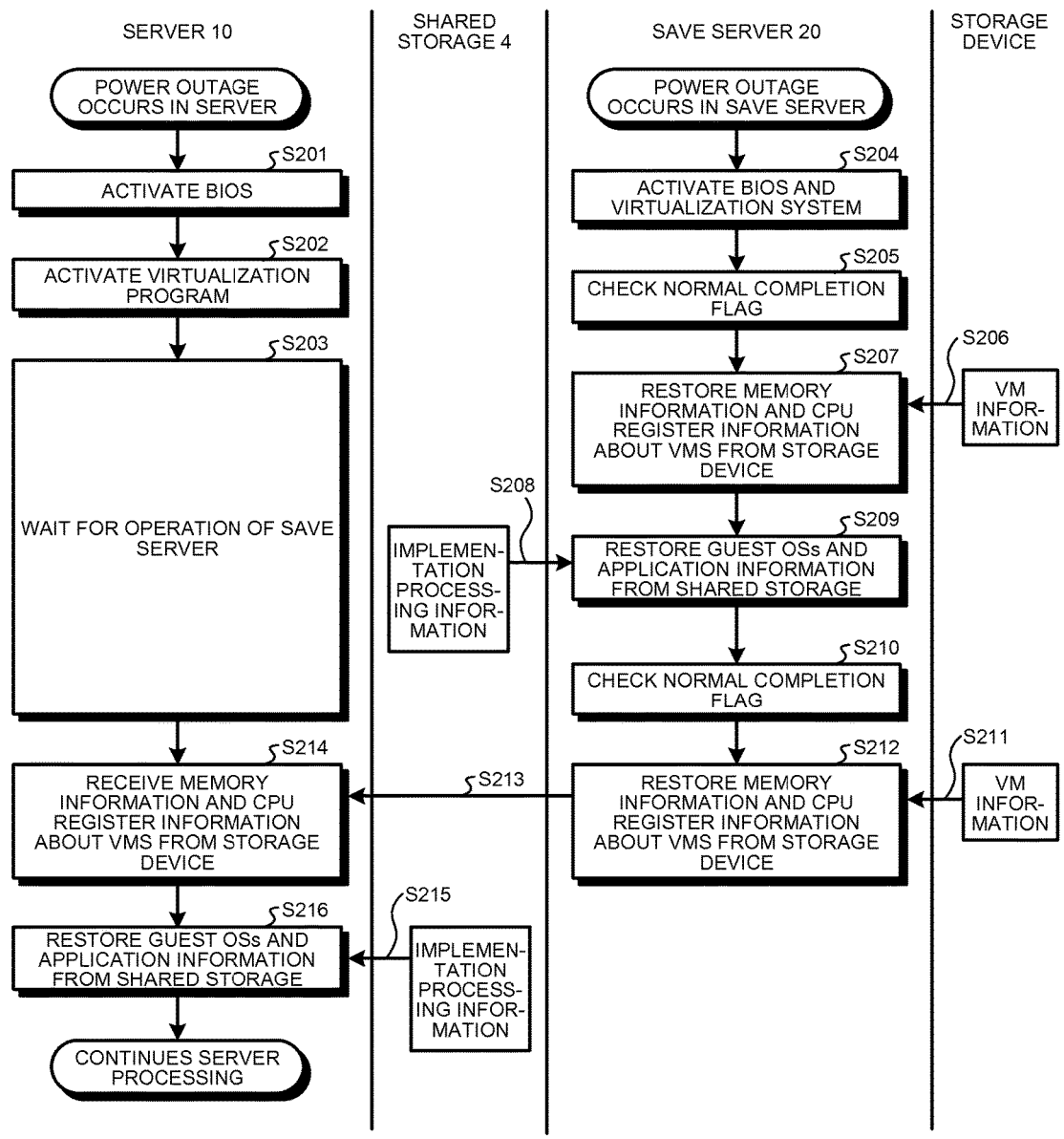
FIG. 11 is a sequence diagram illustrating the re-activation processing of the virtualization system at a time of restoration from a power outage.

Procedure of Processing Performed by the Information Processing System According to the Second Embodiment The following describes a procedure of the processing performed by the information processing system with reference to FIGS. 10 to 13. With reference to FIG. 10, the shutdown processing of the virtualization system at a time of a power outage is described. With reference to FIG. 11, the re-activation processing of the virtualization system at a time of restoration from the power outage is described. The following description is made on the basis of an exemplary case where the VM information and the implementation processing information are normally saved.

Shutdown Processing of the Virtualization System at a Time of a Power Outage

FIG. 10 is a sequence diagram illustrating the shutdown processing of the virtualization system when a power outage occurs. Upon receiving the notification of the occurrence of a power outage, the server 10 and the save server 20 start the processing.

The save unit 13a stops the operation of the guest OSs (step S101). The save unit 13a produces the implementation processing information including information about the guest OSs and the applications in a file format (step S102). The storing unit 13c stores the implementation processing information in the shared storage 4 (step S103). The save unit 13a then produces the VM information including the information about the memories allocated to the VMs and the information about the CPU registers allocated to the VMs as data in a file format (step S104). The save unit 13a transmits the produced data in a file format to the save server 20 (step S105).

Subsequently, the stopping unit 13b shuts down the virtualization system (step S106). The server 10 ends the save processing after the completion of the processing at step S106.

In the save server 20, the receiving unit 23a receives the VM information in a file format from the server 10 (step S107). The first storing unit 23b stores the received VM information in the storage device (step S108). The first storing unit 23b sets the normal completion flag (step S109) and stores the flag in the storage device (step S110). The save server 20 performs the save processing on the server 20 when receiving the VM information from all servers after the completion of the processing at step S110.

After stopping the guest OSs (step S111), the save unit 23d produces the implementation processing information including the information about the guest OSs and the information about the applications in a file format (step S112). The second storing unit 23e stores the implementation processing information in the shared storage 4 (step S113).

The save unit 23d produces the VM information including the information about the memories allocated to the VMs and the information about the CPU registers allocated to the VMs as data in a file format (step S114). The first storing unit 23b stores the VM information in the storage device included in the save server 20 (step S115). The first storing unit 23b then sets the normal completion flag (step S116) and stores the flag in the storage device (step S117). The stopping unit 23c shuts down the virtualization system (step S118). The save server 20 ends the save processing after the completion of the processing at step S118.

Re-Activation Processing of the Virtualization System at the Time of Restoration from the Power Outage FIG. 11 is a sequence diagram illustrating the re-activation processing of the virtualization system at the time of restoration from the power outage. Upon receiving the notification of the restoration from the power outage, the server 10 and the save server 20 start the processing.

As illustrated in FIG. 11, the server 10 activates the BIOS (step S201). The server 10 then activates the virtualization program 13 (step S202). After the completion of the processing, the server 10 waits until the completion of the processing performed by the save server 20 (step S203).

The save server 20 activates the BIOS and then activates the virtualization program 23 (step S204). The restoring unit 23f checks the flag (step S205). After checking the flag, the restoring unit 23f reads the VM information from the storage device (step S206) and restores the VM information (step S207).

The restoring unit 23f reads the implementation processing information from the shared storage 4 (step S208) and restores the implementation processing information (step S209). After the completion of the processing at step S209, the save server 20 continues to perform the processing before the save.

The restoring unit 23f checks the flag (step S210). The restoring unit 23f then reads the VM information about the server 10 from the storage device (step S211) and restores the VM information (step S212). The transmitting unit 23g transmits the VM information to the server 10 (step S213).

In the server 10, the receiving unit 13d receives the VM information (step S214). The read unit 13e reads the implementation processing information from the shared storage 4 (step S215). The restoring unit 13f restores the VM information and the implementation processing information (step S216).

Flag Determination Processing at the Save

Figure 12:
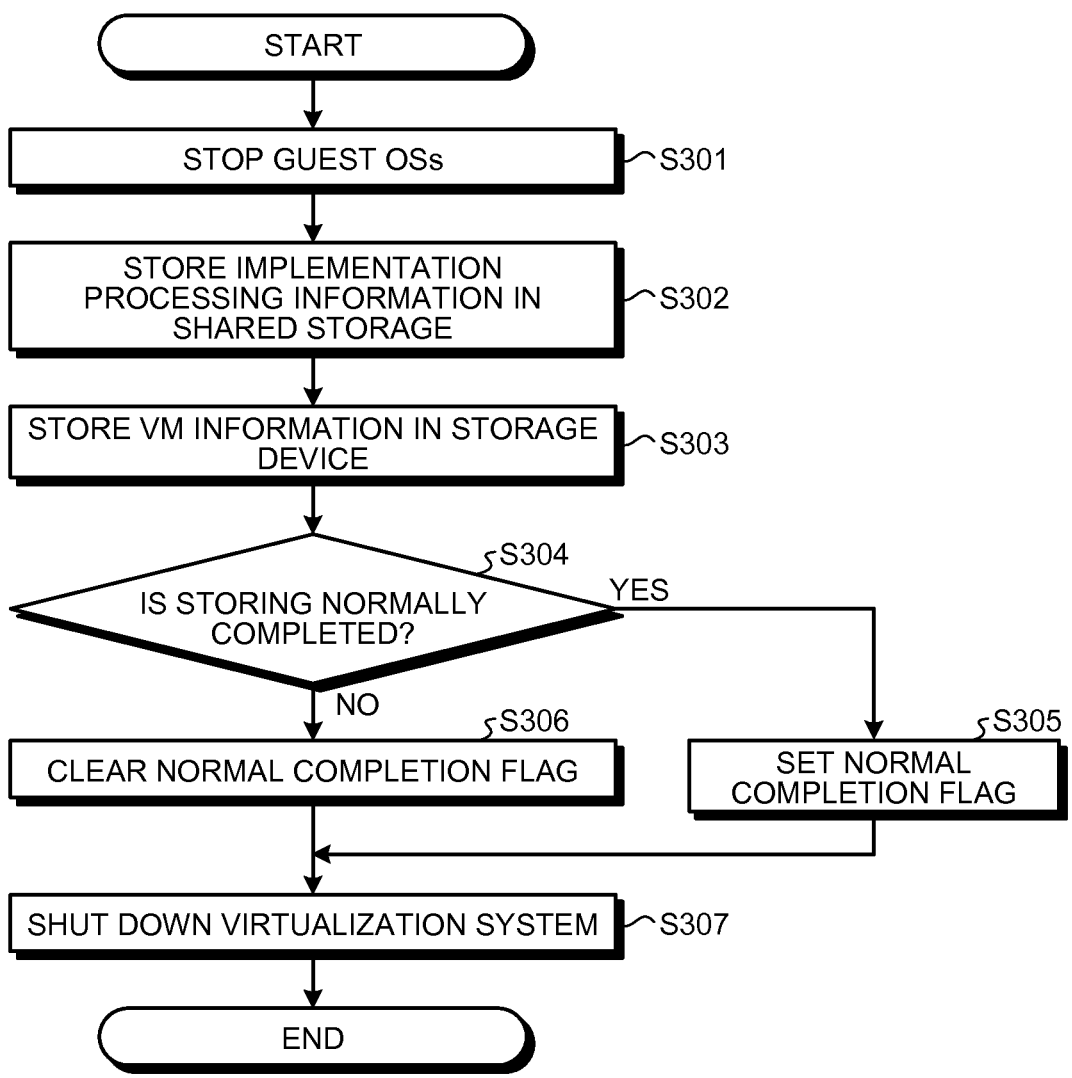
FIG. 12 is a flowchart illustrating a procedure of flag determination processing performed by the save server according to the second embodiment at the time of a power outage.

FIG. 12 is a flowchart illustrating a procedure of flag determination processing performed by the save server according to the second embodiment at a time of a power outage. The flowchart corresponds to the processing at step S116 illustrated in FIG. 10 in the flag determination processing performed by the save server 20 at the time of a power outage.

As illustrated in FIG. 12, the save unit 23*d* stops the guest OSs (step S301). The second storing unit 23*e* stores the implementation processing information in the shared storage 4 (step S302). The first storing unit 23*b* stores the VM information in the storage device (step S303). The first storing unit 23*b* determines whether the storing is normally completed (step S304).

When determining that the storing is normally completed (Yes at step S304), the first storing unit 23*b* sets the normal completion flag (step S305). When determining that the storing is not normally completed (No at step S304), the first storing unit 23*b* clears the normal completion flag (step S306).

After the completion of the processing at step S305 and step S306, the stopping unit 23*c* shuts down the virtualization system (step S307).

Flag Determination Processing at the Time of Restoration from the Power Outage

Figure 13:
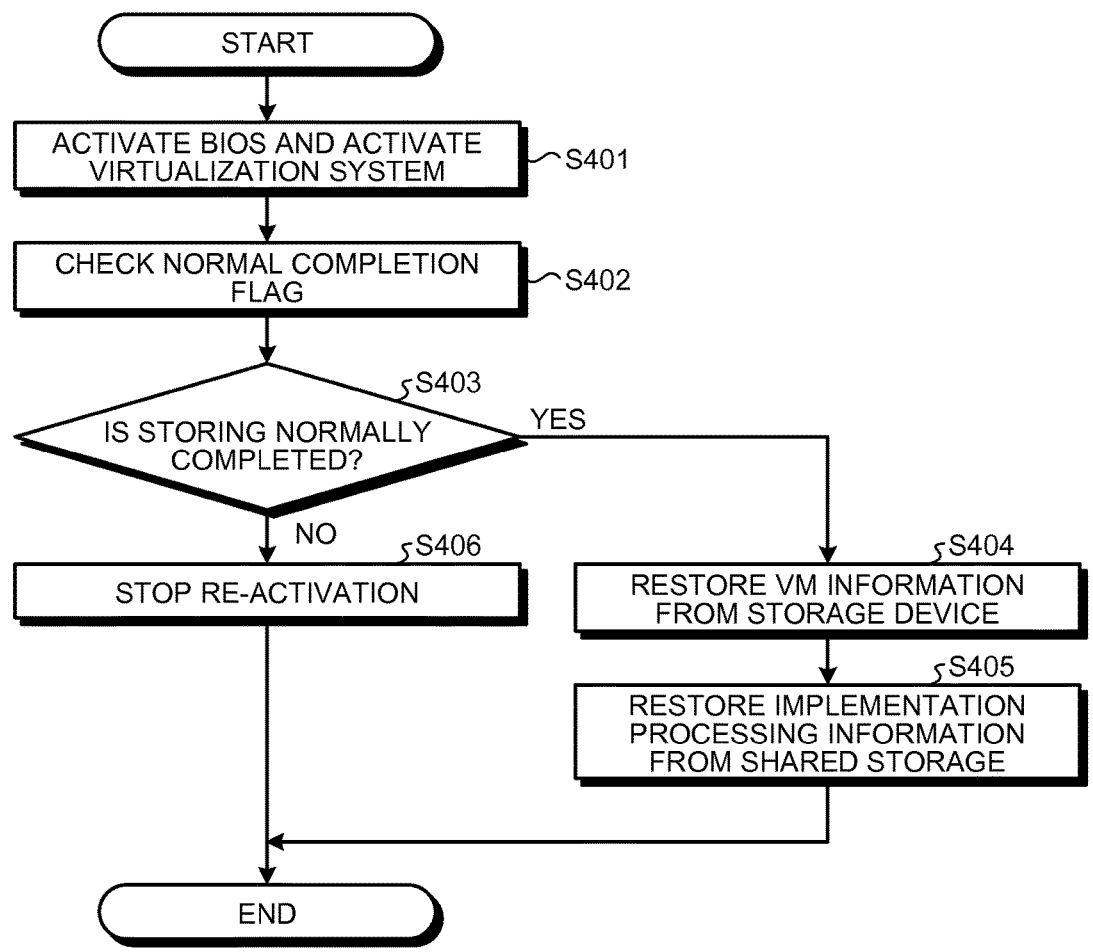
FIG. 13 is a flowchart illustrating a procedure of the flag determination processing performed by the save server according to the second embodiment at the time of restoration from a power outage.

FIG. 13 is a flowchart illustrating a procedure of the flag determination processing performed by the save server according to the second embodiment at the time of restoration from the power outage. The flowchart corresponds to the processing at step S205 illustrated in FIG. 11 in the flag determination processing performed by the save server 20 at the time of restoration from the power outage.

The save server 20 activates the BIOS and then activates the virtualization program 23 (step S401). The restoring unit 23*f* checks the normal completion flag (step S402) and determines whether the storing is normally completed (step S403).

When determining that the storing is normally completed (Yes at step S403), the restoring unit 23*f* reads the VM information from the storage device (step S404). The restoring unit 23*f* reads the implementation processing information from the shared storage 4 and restores the implementation processing information (step S405). After the completion of the processing at step S405, the save server 20 ends the flag determination processing. After the completion of the processing at step S405, the save server 20 activates the VMs that had been running before the save and thereafter performs the resorting processing of the server 10.

When determining that the storing is not normally completed (No at step s403), the restoring unit 23*f* stops the re-activation (step S406). After the completion of the processing at step S406, the save server 20 ends the flag determination processing. In this case, the save server 20 activates the virtualization program newly and operates the VMs newly.

Advantageous Effects of the Second Embodiment

As described above in the second embodiment, a single related UPS protects the guest OSs of the multiple servers, the information about their applications, and the information about the virtual machines at the time of a power outage in an environment where the servers are provided close to each other such as the servers housed in a rack in a data center. As a result, the information processing system 50 can reduce the number of UPSs provided as a power outage measure.

The UPS device 3 consumes power in a normal state and also consumes power to charge up the battery. The information processing system 50 according to the second embodiment can reduce the power consumption in the internal circuit such as the battery of the UPS device 3, thereby making it possible to reduce the power consumption of the whole system.

The information processing system 50 can continue to perform the processing on the basis of the information restored from the saved information, thereby making it possible to reduce the activation time of the system.

[c] Third Embodiment

In the first and the second embodiments, each server performs the processing to save the VMs on the basis of the detection by the power outage detection circuit included in the battery-equipped power supply included therein. As a result, each server individually detects a power outage and performs the save processing of the VMs. The save server also detects a power outage through the power outage detection circuit included in the UPS device. When detecting a power outage, the save server may instruct each server, at the same time, to implement the save processing of the VMs.

In a third embodiment, a case is described where the save server instructs each server, at the same time, to implement the save processing of the VMs when detecting a power outage without using the power outage detection circuit of each server.

Figure 14:
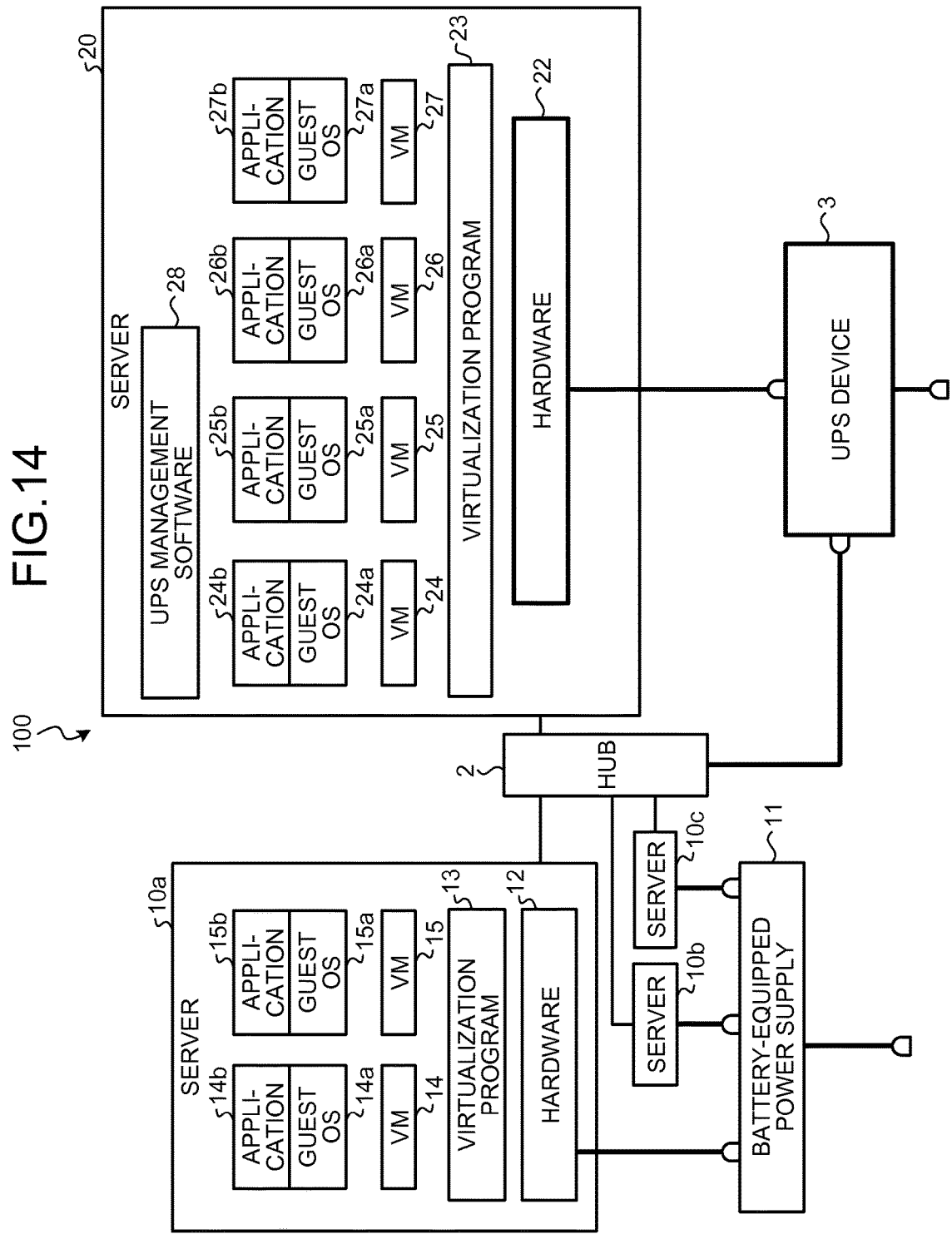
FIG. 14 is a schematic diagram illustrating an example of a structure of an information processing system according to a third embodiment.

FIG. 14 is a schematic diagram illustrating an example of a structure of the information processing system according to the third embodiment. The same elements illustrated in FIG. 14 as those of FIG. 8 are labeled with the same reference numerals and detailed descriptions thereof are thus omitted.

An information processing system 100 illustrated in FIG. 14 includes the hub 2, the UPS device 3, servers 10*a*, 10*b*, and 10*c*, and the server 20. The servers 10*a*, 10*b*, and 10*c* are collectively described as the server 10 as a generalized expression. The information processing system 100 includes the shared storage 4 (not illustrated).

UPS management software 28 included in the server 20 detects a power outage through the power outage detection circuit included in the UPS device. In the server 20 according to the third embodiment, the UPS management software 28 instructs the virtualization program of each server to save the information about the VMs in the save server.

When receiving the instruction from the UPS management software 28, the virtualization program of each server starts the operation to save the VM information in the save server. The information about the guest OSs and the applications are stored in the shared storage. The VM information is stored in the storage device included in the save server. The battery-equipped power supply supplies power from the battery built therein during several tens of seconds needed to save the information.

[d] Fourth Embodiment

In the third embodiment, the information processing apparatus includes the rack housing the multiple servers. Each server includes the battery-equipped power supply. Each server thus needs to provide a space for the battery as compared with a case where each server includes only the power supply. The batteries included in the battery-equipped power supplies of the respective servers may be collectively provided. In a fourth embodiment, the servers each include only the power supply of each of the battery-equipped power supplies, and the batteries thereof are collectively disposed outside the servers.

Figure 15:
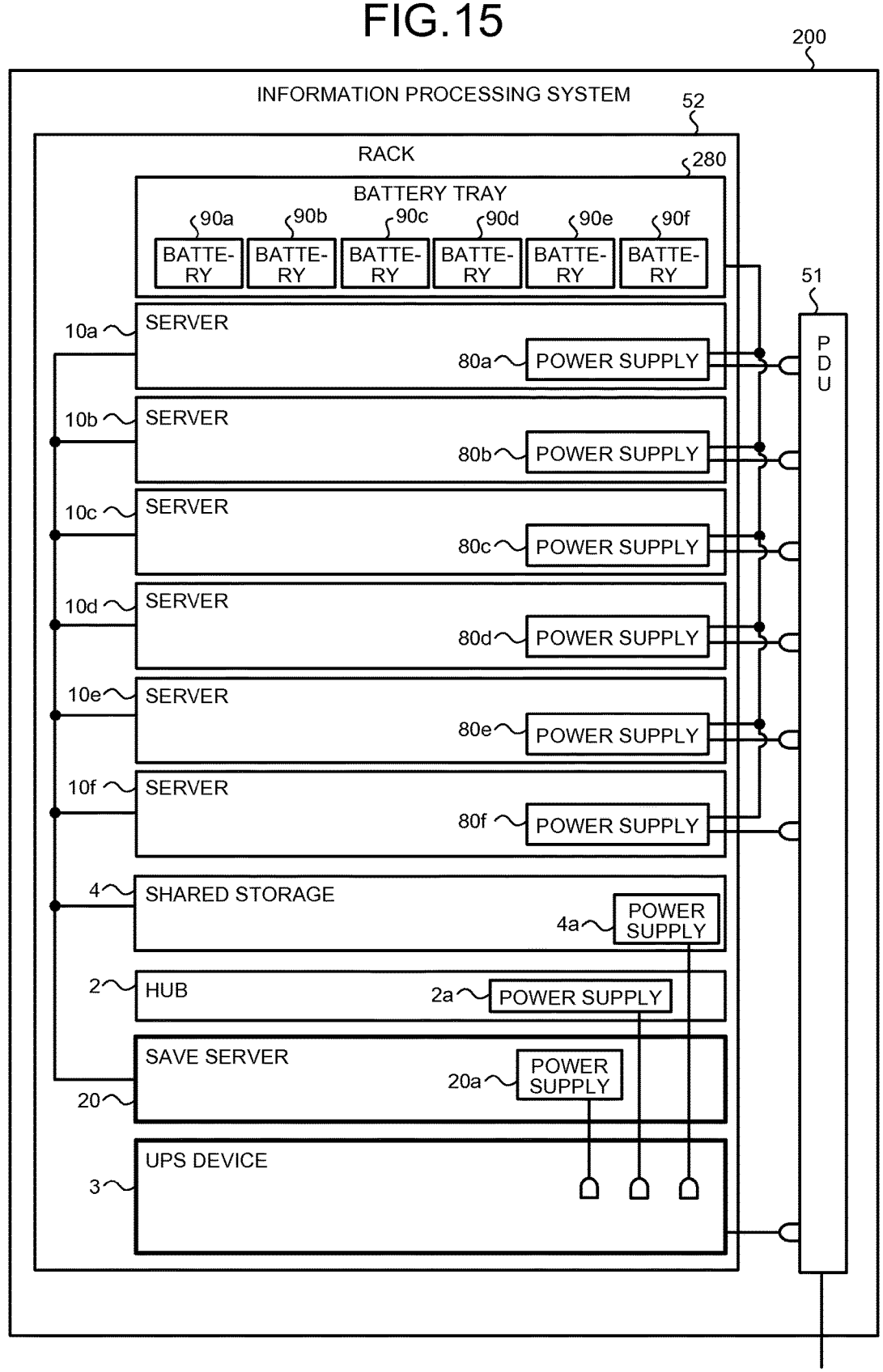
FIG. 15 is a schematic diagram illustrating an example of a structure of an information processing system according to a fourth embodiment.

FIG. 15 is a schematic diagram illustrating an example of a structure of an information processing system according to the fourth embodiment. The same elements as those illustrated in FIG. 3 are labeled with the same reference numerals, and descriptions thereof are thus omitted. As illustrated in FIG. 15, an information processing system 200 includes the PDU 51 and the rack 52. The rack 52 houses the hub 2, the UPS device 3, the shared storage 4, servers 10*a*, 10*b*, 10*c*, 10*d*, 10*e*, and 10*f,* the save server 20, and a battery tray 280. Batteries are coupled to the respective power supplies of the servers with cables. Each battery and the corresponding power supply are coupled with the cable extended from a battery interface of the power supply.

The information processing system 200 collectively mounts, on the battery tray 280, the batteries for power supply backup of the respective servers housed in the rack, thereby needing not to mount the batteries on the respective servers. As a result, each server does not need to provide the space for mounting the battery.

[e] Fifth Embodiment

The invention may be implemented as various embodiments in addition to the embodiments described above. The following describes another embodiment of the invention as a fifth embodiment.

System Structure

In the processes described in the embodiments described above, all or a part of the processes described to be automatically performed can also be manually performed. Alternatively, all or a part of the processes described to be manually performed can also be automatically performed by known methods. In addition, the processing procedures, the control procedures, and the specific names described in the above text and drawings can be arbitrarily modified unless otherwise specified.

The information stored in the storage units illustrated in the drawings is only an example. The information need not be stored in the illustrated manner.

The order of the processing in each step of the processing described in the embodiments described above may be changed in accordance with various loads and usages.

The constituent components illustrated in the drawings are functionally conceptual, and need not be physically structured as illustrated in the drawings. For example, the save unit 13a and the stopping unit 13b may be integrated in the server 10. In the server 20, the first storing unit 23b and the second storing unit 23e may be integrated. All or part of the processing functions performed by the apparatuses may be achieved by a CPU and a program analyzed and executed by the CPU, or may be achieved by hardware based on wired logic.

Computer Program

The various processing described in the embodiments described above can be achieved by a preliminarily prepared program executed by a computer system such as a personal computer or a work station. The following describes an example of the computer system executing a program having the same functions as those of the embodiments described above.

Figure 16:
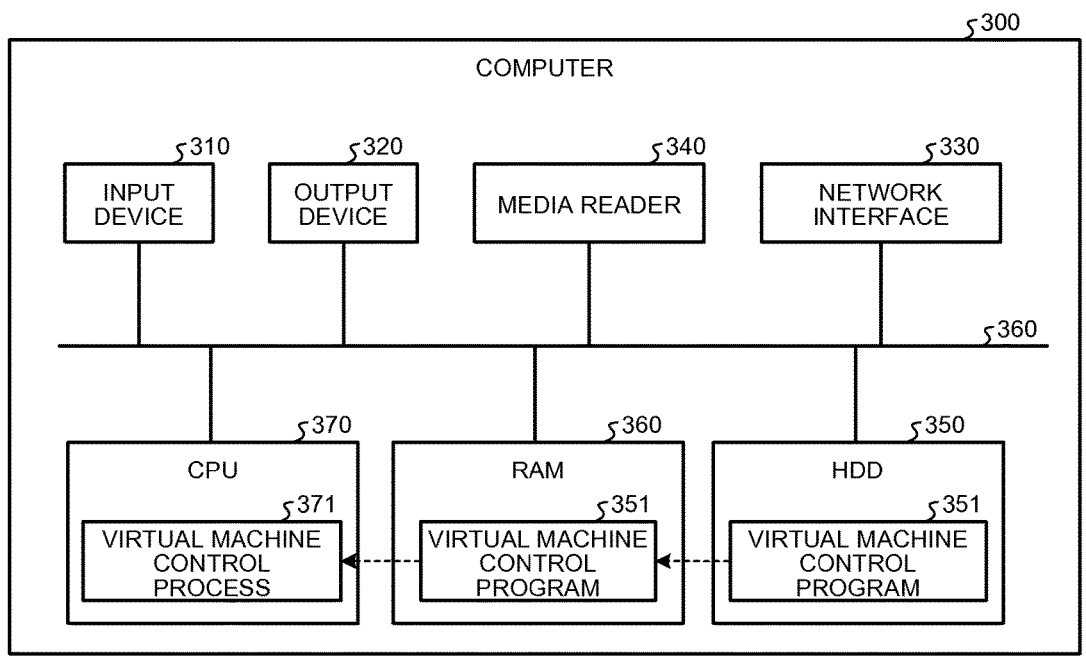
FIG. 16 is a schematic diagram illustrating a computer executing a virtual machine control program.
Figure 17:
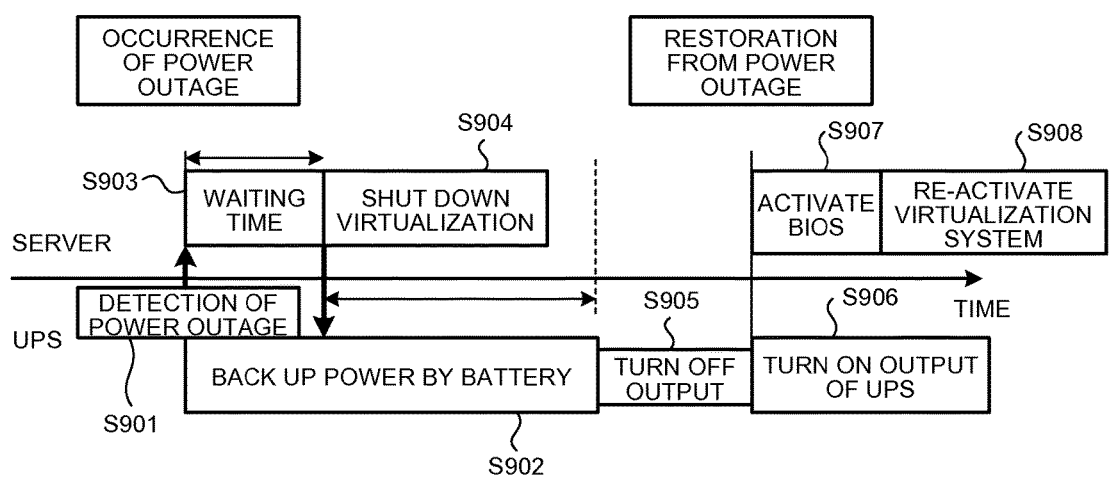
FIG. 17 is a schematic diagram illustrating shutdown processing operation in a virtualization system according to a related technique.

FIG. 16 is a schematic diagram illustrating a computer executing a virtual machine control program. As illustrated in FIG. 16, a computer 300 includes an input device 310 that receives data and various settings from a user, and an output device 320 that performs notification of the state of the computer, for example. The computer 300 further includes a network interface 330 that transmits and receives data between itself and other apparatuses, a media reader 340, an HDD 350, a RAM 360, a CPU 370, and a bus 380. The respective components 310 to 370 are connected to the bus 380.

As illustrated in FIG. 16, the HDD 350 preliminarily stores therein a virtual machine control program 351 that performs the same functions as those of the save unit 13a and the stopping unit 13b illustrated in FIG. 1. The media reader 340 stores therein various types of data to implement the virtual machine control program 351. The CPU 370 reads the virtual machine control program 351 from the HDD 350 and executes the program as a virtual machine control process 371. The virtual machine control process 371 performs the same operation as those of the save unit 13a and the stopping unit 13b illustrated in FIG. 1.

The virtual machine control program 351 need not be stored in the HDD 350. For example, the program may be stored in a "portable physical medium" inserted into the computer 300, such as a flexible disk (FD), a compact disc (CD)-ROM, a magnet-optical (MO) disc, a digital versatile disc (DVD), or an IC card. Alternatively, the program may also be stored in a "fixed physical medium" such as an HDD provided outside the computer 300. The program may be stored in "another computer system" coupled with the computer 300 through public lines, the Internet, a LAN, or a wide area network (WAN), for example. Then, the computer 300 may read the program from them and execute the program.

The program is stored in a recording medium, such as the "portable physical medium", the "fixed physical medium", and the "communication medium" described above, in a computer readable manner. The computer 300 reads the program from the recording medium, executes it, and achieves the same functions as those of the embodiments described above. The program described in the fifth embodiment is not limited to being executed by the computer 300. For example, the invention can be applied to cases where the program is executed by another computer system or server, and executed by cooperation of the computer system and the server.

The invention has an advantage of reducing the number of UPSs.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
   a memory;
   a processor coupled to the memory, wherein the processor executes a process comprising:
      saving, in another information processing apparatus connected to an uninterruptible power supply device, first information including information stored in the memory allocated to a virtual machine operated by the information processing apparatus and information stored in a register allocated to the virtual machine at a time of a power outage; and
      stopping the virtual machine when the saving of the first information is completed; and
   a reserve power supply device that supplies power needed for the processing performed by the processor at the time of the power outage, a supply capacity of the reserve power supply device being smaller than a supply capacity of the uninterruptible power supply device.

2. The information processing apparatus according to claim 1, wherein the process further comprises storing, in a storage shared with the another information processing apparatus, implementation processing information including information about a guest operating system (OS) and information about an application, the guest OS and the application being implemented by the virtual machine.

3. The information processing apparatus according to claim 2, wherein the process further comprises:
receiving the saved first information from the another information processing apparatus at a time of restoring power from the power outage;
reading the implementation processing information from the storage shared with the another information processing apparatus; and
restoring a state of the virtual machine before the saving based on the first information received from the another information processing apparatus and the implementation processing information.

4. An information processing apparatus, comprising:
a memory;
a processor coupled to the memory, wherein the processor executes a process comprising:
receiving, from another information processing apparatus, first information including information stored in a memory allocated to a virtual machine operated by the another information processing apparatus and information stored in a register allocated to the virtual machine at a time of a power outage;
first storing, in a storage of the information processing apparatus, second information including information stored in the memory allocated to a virtual machine operated by the information processing apparatus and information stored in a register allocated to the virtual machine, and the first information received from the another information processing apparatus;
second storing, in a storage shared with the another information processing apparatus, implementation processing information including information about a quest operating system (OS) and information about an application, the quest OS and the application being implemented by the virtual machine operated by the information processing apparatus; and
stopping the virtual machine of the information processing apparatus when the first storing of the second information and the received first information is completed; and
an uninterruptible power supply device that supplies power used for the processing performed by the processor at the time of the power outage.

5. The information processing apparatus according to claim 4, wherein the process further comprises setting a flag indicating that the first information and the second information is normally stored when the respective information is normally stored.

6. The information processing apparatus according to claim 4, wherein the process further comprises:
first reading the stored second information about the information processing apparatus from the storage of the information processing apparatus and the implementation processing information from the storage shared with the another information processing apparatus, and restoring a state of the virtual machine operated by the information processing apparatus before the save; and
second reading the stored first information about the another information processing apparatus from the storage of the information processing apparatus and transmitting the read first information to the another information processing apparatus.

7. A method for controlling an information processing apparatus, the method comprising:

saving, using a processor, in another information processing apparatus connected to an uninterruptible power supply device, first information including information stored in a memory allocated to a virtual machine operated by the information processing apparatus and information stored in a register allocated to the virtual machine at a time of a power outage;
stopping, using the processor, the virtual machine that is running in the information processing apparatus when the saving of the first information is completed; and
supplying power needed to perform the saving and the stopping to the information processing apparatus by an uninterruptible power supply device that supplies power used for processing performed by the processor at the time of the power outage.

8. A non-transitory computer-readable recording medium having stored therein a program for causing a computer to execute, by a processor, a virtual machine control process comprising:
saving, in another information processing apparatus connected to an uninterruptible power supply device, first information including information stored in a memory allocated to a virtual machine and information stored in a register allocated to the virtual machine at a time of a power outage;
stopping the running virtual machine when the save of the first information is completed; and
supplying power needed to perform the saving and the stopping to the computer by an uninterruptible power supply device that supplies power used for processing performed by the processor at the time of the power outage.

9. An information processing system, comprising:
a first information processing apparatus that operates a first virtual machine; and
a second information processing apparatus that operates a second virtual machine and that includes an uninterruptible power supply device, wherein
the first information processing apparatus includes:
a first memory;
a first processor coupled to the first memory, wherein the first processor executes a process comprising:
saving, in the second information processing apparatus, first information including information stored in the first memory allocated to the first virtual machine and information stored in a register allocated to the first virtual machine at a time of a power outage;
first stopping the first virtual machine when the saving of the first information is completed; and
a reserve power supply device that supplies power needed for the processing performed by the first processor at the time of the power outage, and
the second information processing apparatus includes:
a second memory;
a second processor coupled to the second memory, wherein the second processor executes a process comprising:
receiving, from the first information processing apparatus, the first information including the information stored in the first memory allocated to the first virtual machine and the information stored in the register allocated to the first virtual machine at the time of the power outage;
storing, in a storage of the second information processing apparatus, second information including information stored in the second memory allocated to the second virtual machine and information stored in a register allocated to the second virtual machine, and the first information received from the first information processing apparatus; and second stopping the second virtual machine when the storing of the second information and the received first information is completed, wherein the uninterruptible power supply device supplies power used for the processing performed by the second processor at the time of the power outage.

* * * * *